US007667350B2

(12) United States Patent
Norimatsu et al.

(10) Patent No.: US 7,667,350 B2
(45) Date of Patent: Feb. 23, 2010

(54) ELECTRIC POWER SOURCE APPARATUS USING FUEL CELL AND METHOD OF CONTROLLING THE SAME

(75) Inventors: Yasuaki Norimatsu, Hitachinaka (JP); Akihiko Kanouda, Hitachinaka (JP); Mutsumi Kikuchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 437 days.

(21) Appl. No.: 11/259,258

(22) Filed: Oct. 27, 2005

(65) Prior Publication Data
US 2006/0068242 A1 Mar. 30, 2006

Related U.S. Application Data

(63) Continuation-in-part of application No. 11/211,635, filed on Aug. 26, 2005.

(30) Foreign Application Priority Data

Sep. 30, 2004 (JP) .............................. 2004-287617
Sep. 22, 2005 (JP) .............................. 2005-275825

(51) Int. Cl.
*H01M 12/00* (2006.01)
*H01M 10/44* (2006.01)
(52) U.S. Cl. .............................. 307/87; 307/43; 307/44; 307/48; 307/51; 307/52; 307/85; 307/86; 320/101; 320/124; 320/127; 320/128; 320/129; 320/130; 320/135; 320/137; 320/166
(58) Field of Classification Search ............. 307/43–44, 307/48, 51–52, 85–87; 320/101, 124, 127–130, 320/135, 137, 166
See application file for complete search history.

(56) References Cited

U.S. PATENT DOCUMENTS

| 5,156,928 | A | * | 10/1992 | Takabayashi ................. 429/23 |
| 5,334,463 | A | * | 8/1994 | Tajima et al. ................. 429/9 |
| 5,612,580 | A | * | 3/1997 | Janonis et al. ................. 307/64 |
| 5,849,426 | A | * | 12/1998 | Thomas et al. ................. 429/7 |
| 5,916,699 | A | * | 6/1999 | Thomas et al. ................. 429/3 |
| 6,011,324 | A | * | 1/2000 | Kohlstruck et al. ........... 307/64 |
| 6,020,719 | A | * | 2/2000 | Nishigaki et al. ........... 320/128 |
| 6,087,039 | A | * | 7/2000 | Van Lerberghe .......... 429/150 |
| 6,268,077 | B1 | * | 7/2001 | Kelley et al. ................. 429/33 |
| 6,326,097 | B1 | * | 12/2001 | Hockaday ................... 429/34 |
| 6,369,461 | B1 | * | 4/2002 | Jungreis et al. ............... 307/46 |

(Continued)

FOREIGN PATENT DOCUMENTS

JP 63-110920 5/1988

(Continued)

*Primary Examiner*—Stephen W Jackson
*Assistant Examiner*—Adi Amrany
(74) *Attorney, Agent, or Firm*—Antonelli, Terry, Stout & Kraus, LLP.

(57) ABSTRACT

A method of controlling an electric power source apparatus, which comprises supplying electric power to an electronic device on which a secondary battery is mounted from a power source apparatus having a fuel cell and an auxiliary power source. Electric power is supplied intermittently to a charging terminal of the electronic device by means of a switch for controlling conduction and interruption of an output terminal of the power source apparatus.

8 Claims, 24 Drawing Sheets

U.S. PATENT DOCUMENTS

| | | | |
|---|---|---|---|
| 6,447,945 B1* | 9/2002 | Streckert et al. | 429/34 |
| 6,573,682 B1* | 6/2003 | Pearson | 320/101 |
| 6,590,370 B1* | 7/2003 | Leach | 323/299 |
| 6,649,298 B2* | 11/2003 | Hayashi et al. | 429/34 |
| 6,794,844 B2* | 9/2004 | Hochgraf et al. | 320/101 |
| 6,869,708 B2* | 3/2005 | Kelley et al. | 429/23 |
| 6,882,131 B1* | 4/2005 | Takada et al. | 323/282 |
| 6,930,897 B2* | 8/2005 | Jungreis et al. | 363/95 |
| 7,011,902 B2* | 3/2006 | Pearson | 429/13 |
| 7,091,625 B2* | 8/2006 | Okusawa et al. | 290/1 R |
| 7,183,014 B2* | 2/2007 | Sasaki et al. | 429/7 |
| 7,199,488 B1* | 4/2007 | Baker | 307/43 |
| 7,216,246 B2* | 5/2007 | Ozeki et al. | 713/340 |
| 7,247,399 B2* | 7/2007 | Ozeki | 429/13 |
| 7,307,360 B2* | 12/2007 | Gonzales et al. | 307/64 |
| 7,326,480 B2* | 2/2008 | Fuglevand | 429/9 |
| 7,351,485 B2* | 4/2008 | Shioya | 429/22 |
| 7,359,739 B2* | 4/2008 | Ogura | 455/575.1 |
| 7,362,073 B2* | 4/2008 | Lecky | 320/132 |
| 7,393,604 B2* | 7/2008 | Rocke et al. | 429/22 |
| 7,405,535 B2* | 7/2008 | Frerking et al. | 320/106 |
| 7,449,259 B2* | 11/2008 | Zhu et al. | 429/23 |
| 7,521,138 B2* | 4/2009 | Pearson | 429/9 |
| 2002/0021109 A1* | 2/2002 | Marvin et al. | 320/134 |
| 2002/0047309 A1* | 4/2002 | Droppo et al. | 307/43 |
| 2002/0114986 A1 | 8/2002 | Aoyagi et al. | |
| 2003/0111908 A1* | 6/2003 | Christensen | 307/43 |
| 2004/0053082 A1* | 3/2004 | McCluskey et al. | 429/9 |
| 2004/0174072 A1* | 9/2004 | Bourilkov et al. | 307/66 |
| 2005/0053810 A1* | 3/2005 | Kato et al. | 429/13 |
| 2006/0166050 A1* | 7/2006 | Autenrieth | 429/13 |

FOREIGN PATENT DOCUMENTS

| | | |
|---|---|---|
| JP | 05-091727 | 4/1993 |
| JP | 08-140278 | 5/1996 |
| JP | 2001-218387 | 8/2001 |
| JP | 2002-32154 | 1/2002 |
| JP | 2002-216818 | 8/2002 |
| JP | 2002-238182 | 8/2002 |
| JP | 2002-246071 | 8/2002 |
| JP | 2003-070182 | 3/2003 |
| JP | 2004-064855 | 2/2004 |

* cited by examiner

ELECTRIC POWER SOURCE APPARATUS USING FUEL CELL AND METHOD OF CONTROLLING THE SAME

CROSS-REFERENCE TO RELATED APPLICATIONS

This is a continuation-in-part application of application Ser. No. 11/211,635, filed Aug. 26, 2005.

CLAIM OF PRIORITY

This application claims priority from Japanese applications Serial No. 2004-287617, filed on Sep. 30, 2004 and Serial No. 2005-275825, filed Sep. 22, 2005 the contents of which are hereby incorporated by reference into this application.

BACKGROUND OF THE INVENTION

1. Field of the Invention

The present invention relates to an electric power source apparatus using a fuel cell and a method of controlling the apparatus.

2. Related Art

As a result of recent development in electronic technologies, rapid popularization of mobile phones, notebook personal computers (hereinafter referred to as notebook PC), audio-visual apparatuses or mobile terminal devices is going on. These portable devices are driven by secondary batteries. New type of secondary batteries appeared; they were downsized and made high-energy density. The batteries have changed from seal-lead batteries, Ni/Cd batteries, Ni hydrogen batteries to Li ion batteries. In any batteries, development of active materials and high capacity battery structures have been made so as to increase energy density and to realize electric power sources with a longer service time.

In the portable electronic devices, an attempt for low electric power consumption has been made enthusiastically. However, it is necessary to add new functions to meet increasing user's demands. Therefore, there is a tendency that the electric power consumption of the portable electronic devices will increase further. Accordingly, electric power sources with a high energy density and a longer continuous service time are needed.

In order to realize an electric power source with a long continuous service time by secondary batteries, the charging time is a critical issue. Thus, demands for small sized generators that do not need charging are increasing; as a solution of this object, fuel cells have been considered.

Fuel cells that use as fuel hydrogen produced by reforming are widely known. These fuel cells are operated at 80° C. or higher, but fuel cells that use liquid fuel are Direct Methanol Fuel Cells (DMFC) that directly oxidize methanol at a fuel electrode. DMFC is safe with respect to temperatures; it is applied to mobile electronic devices as disclosed in patent document No. 1.

Patent document No. 1: Japanese patent laid-open 2002-32154

Although fuel cells have volume energy density (WH/L) and weight energy density (Wh/kg) superior to conventional secondary batteries in high density, output density of the fuel cell is low. Accordingly, if fuel cells are mounted on electronic devices that need high outputs, an area for electric generation must be designed for generating the high output. Fuel cells with such a large generation area would have a size and weight approximately equal or more to those of the conventional secondary batteries.

As one application for high output mobile devices there are external charger types. The external battery charger for mobile devices needs a capability capable of outputting electric power equivalent to an AC adapter for the mobile devices; the charger should meet performance of the total output for driving electric power for the mobile device and a secondary battery mounted on the mobile device. However, because of low output density of the fuel cell it is very difficult to realize downsizing and lightweight of the electric power source apparatus when the fuel cell is mounted on the external battery charger for the mobile device. On the other hand, although the fuel cells can be made small-sized and lightweight but have a small generation area and a small output power, the fuel cells used as an exterior battery charger that requires a guaranteed power of the AC adapter for conventional devices are difficult to employ; the system can be applied to devices that are designed not to require an electric power larger than a certain value, which lacks reality.

SUMMARY OF THE INVENTION

It is an object of the present invention to provide an electric power source apparatus, which can be used as an external battery charger without enlarging the size of a fuel cell and to a method of controlling the apparatus.

The present invention provides an electric power source apparatus with a high interchangeability, which can be used for the conventional devices as they are, wherein the apparatus is provided with, in addition to the electric power source, a high energy density power source such as a fuel cell, and as an auxiliary power source a high output density power source such as an electric double layer condenser, a Ni/hydrogen battery, a Li ion battery, which is used for HEVs or EVs.

The present invention relates to a method of controlling an electric power source apparatus having two kinds of electric power sources comprising a fuel cell and an auxiliary power source by which electric power is supplied to a charging terminal of an electronic device on which a secondary battery is mounted, wherein the electric power is intermittently supplied to the charging terminal of the electronic device by means of a switch capable of controlling conduction and interruption of the output terminal of the electric power source apparatus.

In the controlling method, the electric power is supplied to the charging terminal of the electronic device on which the secondary battery is mounted from the fuel cell and the auxiliary power source in parallel at the time of the conduction of the output terminal of the electric power source apparatus.

Further, the present invention relates to an electric power source apparatus for supplying electric power to a charging terminal of an electronic device, which is provided with a fuel cell with an output smaller than the necessary maximum electric power of the electronic device and at least one kind of auxiliary electric power sources, the fuel cell and the auxiliary electric power source being disposed in parallel with each other.

EXPLANATION OF REFERENCE NUMERALS

Figure 1:
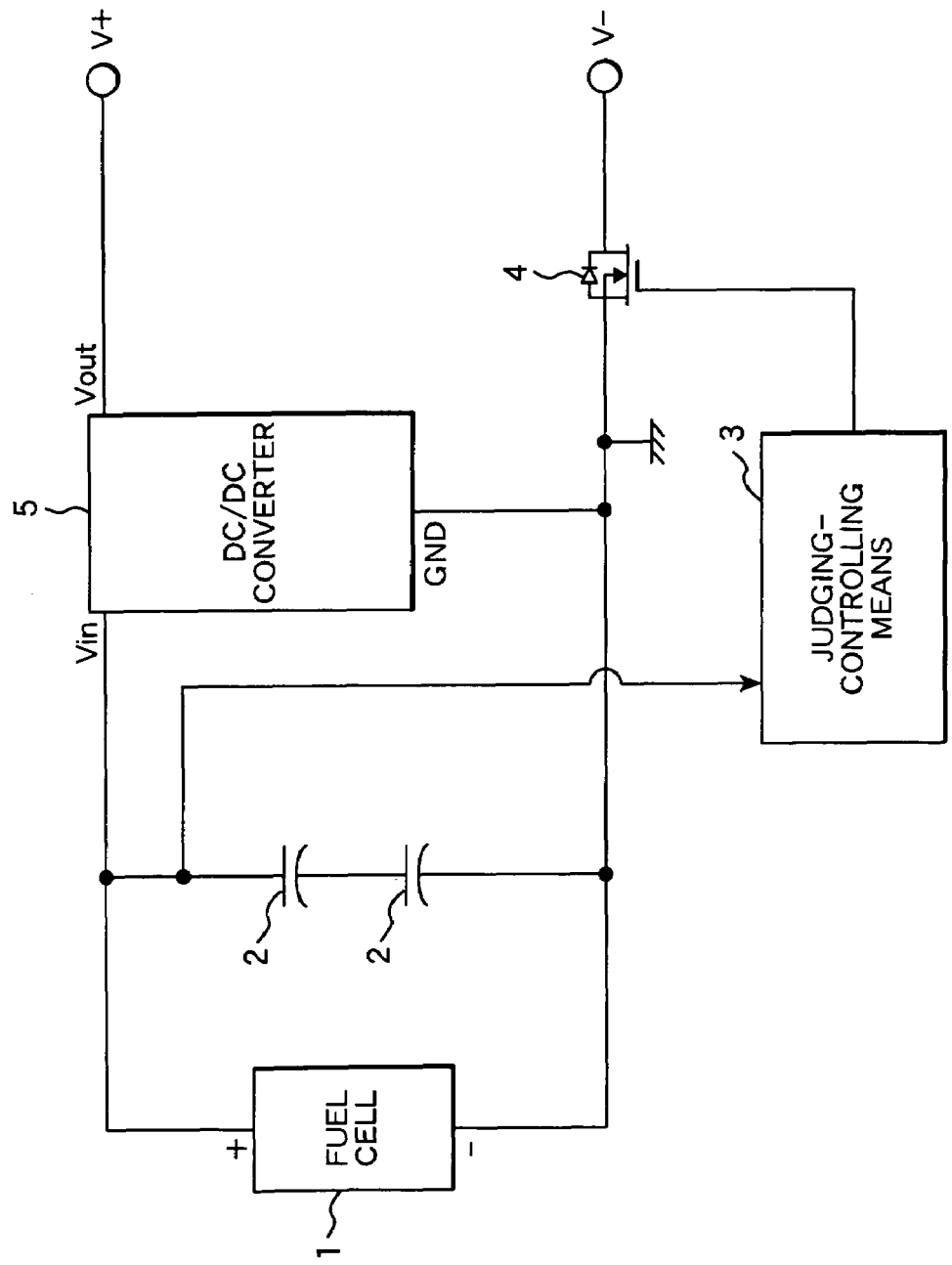
FIG. 1 is a diagrammatic view of an electric power source apparatus of an embodiment according to the present invention.

Fuel cell; 1, electric double layer condenser; 2, judging-controlling means; 3, load breaking switch; 4, DC/DC converter; 5, EDLC charging switch; 6, fuel cell discharge switch; 7, Li ion battery; 8, electric power source apparatus; 10, AC adapter; 11, notebook PC; 12, mobile phone; 13, PDA; 14, emergency charging button; 20, constant voltage diode; 21

DETAILED DESCRIPTION OF THE PREFERRED EMBODIMENTS

According to the embodiments of the present invention, downsizing, light-weight and cost-down of the electric power source apparatus can be realized and the apparatus can be applied to conventional electronic devices without changing specification.

In the following the electric power source apparatus and the method of controlling the apparatus will be explained. The present invention is not limited to the embodiments, and some of them can be combined.

One aspect of the present invention resides in a method of controlling an electric power source for supplying electric power to a charging terminal of an electronic device on which a secondary battery is mounted from the electric power source comprising a fuel cell and an auxiliary power source, which comprises:

supplying electric power to the charging terminal of the electronic device from the fuel cell and the auxiliary electric power source at the time of conduction of the output terminal of the electric power source, charging the auxiliary electric power source from the fuel cell at the time of the interruption of the output terminal, supplying intermittently to the charging terminal of the electronic device, and increasing a lower threshold value of the discharge voltage of the auxiliary electric power source in response to elevation of temperature of the fuel cell.

Another aspect of the present invention resides in the controlling method, wherein an upper threshold value of the charging voltage of the auxiliary electric power source is increased in response to the elevation of temperature of the fuel cell.

Still another aspect of the present invention resides in the controlling method, wherein the auxiliary electric power source is an electric double layer condenser.

Still further aspect of the present invention resides in the controlling method, wherein data on the lower threshold value of the discharge voltage and/or the upper threshold voltage of the charging voltage of the auxiliary electric power source is memorized in a memory device, whereby the charging voltage of the auxiliary voltage is changed by means of the data.

Another aspect of the present invention resides in an electric power source for supplying electric power to a charging terminal of an electronic device, which comprises:

a fuel cell for supplying an output to an output terminal of the electronic device, an auxiliary electric power source connected to the fuel cell in parallel, and a controlling means that performs supplying electric power to the charging terminal of the electronic device from the fuel cell and the auxiliary electric power source at the time of conduction of the output terminal of the electric power source, charging the auxiliary electric power source from the fuel cell at the time of the interruption of the output terminal, supplying intermittently to the charging terminal of the electronic device, and increasing a lower threshold value of the discharge voltage of the auxiliary electric power source in response to elevation of temperature of the fuel cell.

Another aspect of the present invention resides in the electric power source apparatus, wherein an upper threshold value of the charging voltage of the auxiliary electric power source is increased in response to the elevation of temperature of the fuel cell.

Still another aspect of the present invention resides in the electric power source apparatus, wherein the auxiliary electric power source is an electric double layer condenser.

Another aspect of the present invention resides in the electric power source apparatus, which further comprises: means for memorizing data of the lower threshold value of the discharge voltage or the upper threshold value of the charging voltage of the auxiliary electric power source, wherein the control means changes charging or discharging voltage of the auxiliary electric power source, based on the data of the lower threshold value or the upper limit threshold value in the memorizing means.

Another aspect of the present invention resides in an electric power source for supplying electric power to a charging terminal of an electronic device, which comprises a fuel cell for supplying output electric power to the electronic device; an auxiliary electric power source connected with the fuel cell in parallel with each other; an open circuit voltage cutoff switch disposed between terminals at the output side of the auxiliary electric power source; and a load interruption switch disposed at the output side.

Still another aspect of the present invention resides in the electric power source, wherein the load breaking switch is a MOSFET.

Another aspect of the present invention resides in a method of controlling an electric power source for supplying electric power to a charging terminal of an electronic device, wherein the electric power source comprises a fuel cell for supplying output power to the electronic device, an auxiliary electric power source connected to the fuel cell in parallel with each other, and a memorizing means for memorizing data of the lower limit threshold value or the upper limit threshold value of the discharging voltage of the auxiliary electric power source, which comprises: changing the charging-discharging voltage of the auxiliary electric power source by using the data of the lower limit threshold value or the upper limit threshold value of the discharging voltage of the auxiliary electric power source.

Another aspect of the present invention resides in the method of controlling an electric power source, which further comprises an open circuit voltage cutoff switch, and a load breaking switch disposed at the output side, wherein the load breaking switch and the open circuit voltage cutoff switch are opened at the time of starting of the fuel.

Another aspect of the present invention resides in a method of controlling an electric power source apparatus comprising a fuel cell for supplying an output power to an electronic device, an auxiliary electric power source connected to the fuel cell in parallel with each other, an open circuit voltage cutoff switch disposed between terminals of output side of the auxiliary electric power source, and a load breaking switch disposed at the output side, wherein the open circuit voltage cutoff switch and the load breaking switch are closed when a voltage of the auxiliary electric power source is higher than a predetermined voltage.

Another aspect of the present invention resides in the method of controlling an electric power source apparatus, wherein the voltage condition of the auxiliary electric power source is judged after the temperature condition of the fuel cell.

Another aspect of the present invention resides in a method of controlling an electric power source apparatus comprising a fuel cell for supplying an output power to an electronic device, an auxiliary electric power source connected to the fuel cell in parallel with each other, an open circuit voltage cutoff switch disposed between terminals of output side of the auxiliary electric power source, and a load breaking switch disposed at the output side, wherein the open circuit voltage cutoff switch is opened and the load breaking switch is closed when a voltage of the auxiliary electric power source is higher than a predetermined voltage.

A still another aspect of the present invention resides in the method of controlling an electric power source apparatus, wherein the voltage condition of the auxiliary electric power source is detected after the temperature condition of the fuel cell is judged.

Another aspect of the present invention resides in a method of controlling an electric power source apparatus comprising a fuel cell for supplying an output power to an electronic device, an auxiliary electric power source connected to the fuel cell in parallel with each other, an open circuit voltage cutoff switch disposed between terminals of output side of the auxiliary electric power source, and a load breaking switch disposed at the output side, wherein the open circuit voltage cutoff switch and the load breaking switch are closed when a voltage of the auxiliary electric power source is lower than a predetermined voltage.

A still another aspect of the present invention resides in the method of controlling an electric power source, wherein the voltage condition of the auxiliary electric power source is detected after the temperature condition of the fuel cell is judged.

A still another aspect of the present invention resides in a method of controlling an electric power source apparatus for supplying electric power to a charging terminal of an electronic device from an electric power source having a fuel cell and an auxiliary electric power source, the electric power source apparatus comprising a DC/DC converter for converting voltage supplied from the fuel cell and the auxiliary electric power source to the charging terminal into a constant output voltage, and judging and controlling means for controlling the DC/DC converter, wherein the DC/DC converter is driven after the fuel cell is started, and the judging-controlling means is driven after the DC/DC converter is driven.

Another aspect of the present invention resides in the method of controlling the electric power source apparatus, wherein the DC/DC converter is driven when the auxiliary electric power source becomes higher than a predetermined value.

Another aspect of the present invention resides in a method of controlling an electric power source apparatus for supplying electric power to a charging terminal of an electronic device from an electric power source having a fuel cell and an auxiliary electric power source, the electric power source apparatus comprising a DC/DC converter for converting voltage supplied from the fuel cell and the auxiliary electric power source to the charging terminal into a constant output voltage, and judging and controlling means for controlling the DC/DC converter, wherein the DC/DC converter is stopped after a voltage of the auxiliary electric power source becomes lower, and the judging-controlling means is stopped after the DC/DC converter is stopped.

Another aspect of the present invention resides in the method of controlling the electric power source apparatus, wherein the DC/DC converter is stopped after the voltage of the auxiliary electric power source becomes lower than the predetermined voltage.

Embodiment 1

The embodiment 1 will be explained by reference to FIGS. 1 to 9. FIG. 1 is a block diagram showing a construction of the electric power source apparatus, and connections of power lines and signal lines. In this embodiment the number of fuel cells is set so that the maximum voltage of the fuel cell does not exceed the withstanding voltage of the electric double layer condenser.

In this embodiment the circuit has a fuel cell 1, which is used as a high energy density power source, and an electric double layer condenser (EDLC) 2, which is used as a high power density power source. The EDLC can be substituted by another secondary battery that generates a necessary power. In order to simplify the construction of the circuit, a direct methanol fuel cell (DMFC) is preferable for the fuel cell 1.

Although two EDLCs 2 are used in FIG. 1, the number of EDLC should be such that the maximum voltage calculated from the number of series fuel cells required for outputting electric power does not exceed the withstanding voltage of the EDLC. In considering that the maximum cell voltage of the unit cell is about 1.2 to 0.8 V, it is preferable to design the circuit in a manner that 2 to 4 cells of the fuel cells to one cell of EDLC 2 are disposed.

The circuit using the two kinds of the power sources comprises a DC/DC converter 5 for converting the output voltages of the power sources into a constant output voltage (a voltage between the Vout and GND), a load breaking switch 4 for controlling the supply to the load and interruption of the supply, and a judging-controlling means 3 for controlling ON and OFF of the load breaking switch 4.

Figure 6:
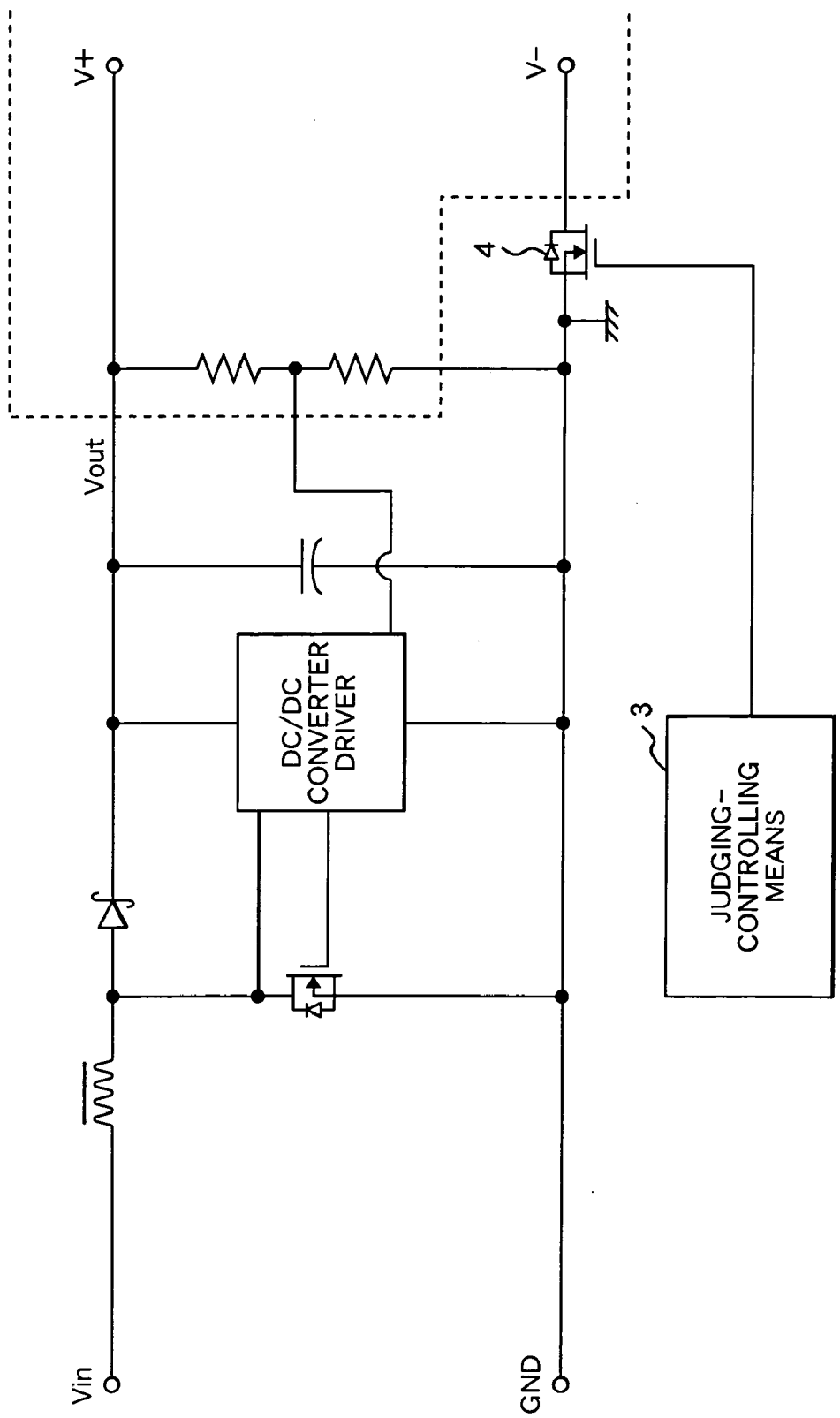
FIG. 6 is a diagrammatic view of an embodiment wherein the electric power source apparatus and an AC adapter cable are separable.

An example of the construction of the DC/DC converter 5 is shown in FIG. 6. The DC/DC converter 5 may be an insulated type (forward, fly-back, push-pull, etc) or a chopper type voltage booster converter, which is effective for lowering the number of the cells of the two kind power sources; depressive type converters or boosting type converters may be used according to load voltages.

In FIG. 6, a synchronous rectifier switch using a P channel power MOS FET may be used in place of a schottky diode. In FIG. 1, an N channel power MOS FET is used as the load breaking switch 4; the P channel power MOS FET can be used at the Vout side of the DC/DC converter 5, or other types of switches may be used.

Figure 2:
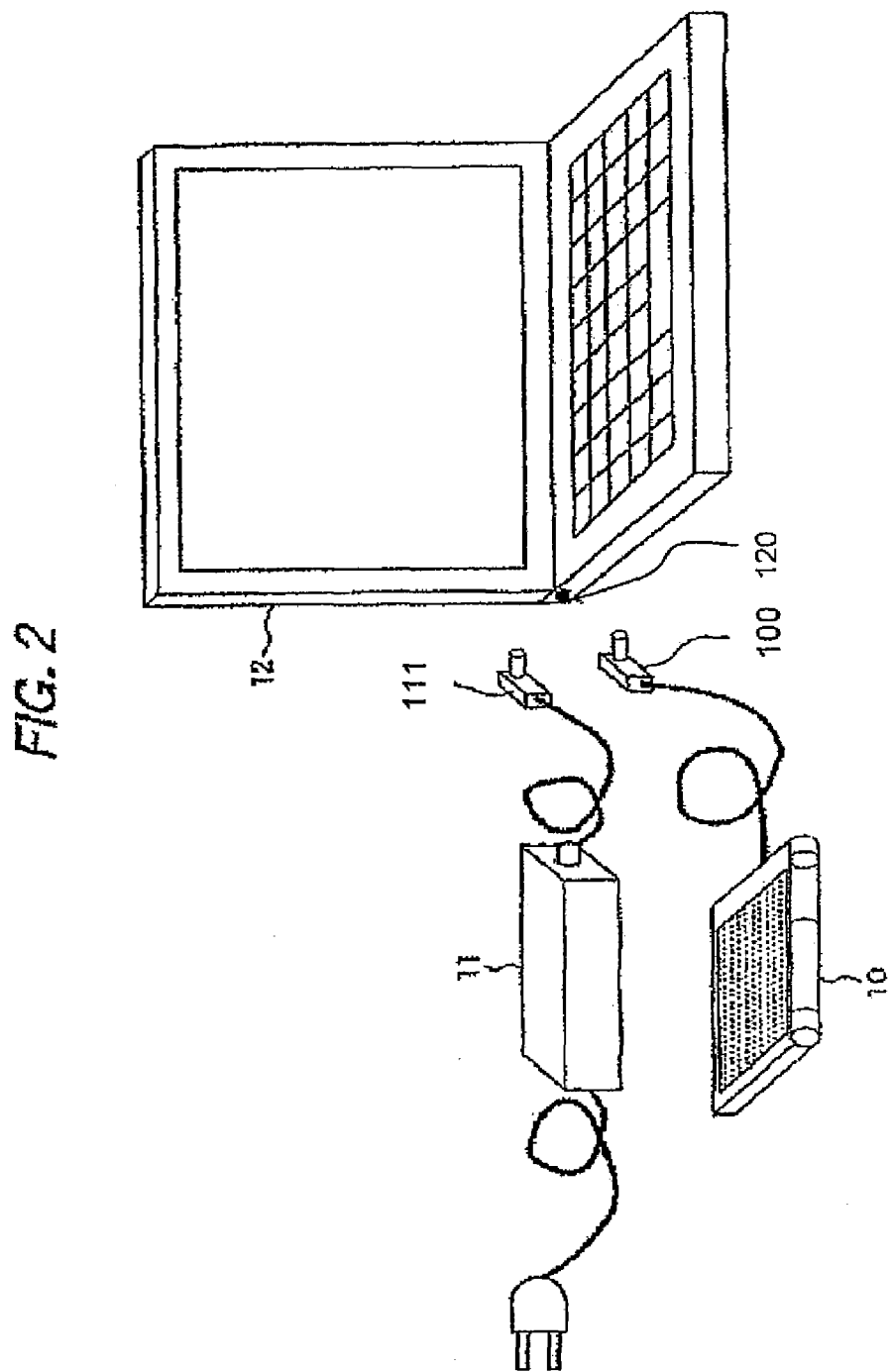
FIG. 2 is a perspective view of an embodiment in which the preset invention is applied to a notebook personal computer.

The electric power source apparatus of this embodiment will be explained by reference to FIGS. 2, 3, 4 and 5. FIG. 2 shows that the electronic device is a notebook PC 12. The electric power source apparatus 10 is interchangeable with an AC adapter 11 for the notebook PC. V+ and V− of FIG. 1, which are corresponding to an output terminal 100 of the electric power source 10 of FIG. 2 and are connecting terminals for connecting the electric power source 10 to the notebook PC 12, are connectable with the notebook PC's terminals 120 for connecting the AC adapter 11 in place of the AC adapter. A voltage (16V, 19V, 20V, etc), which is interchangeable with the voltage of the AC adapter, is outputted from the DC/DC converter 5 through the output terminal 100.

Terminal structures of AC adapters are poor in interchangeability because of difference in products of makers; output voltages differ from products to products such as 16 V, 19V, 20 V, etc. In order to solve the problem of non-interchangeability, the electric power source apparatus and the AC adapter cable are separated, which is shown in FIG. 6. As shown in FIG. 6, it is possible to alter an output voltage if the feed-back resistance portion of the DC/DC converter is built in the AC adapter cable side. Further, the interchangeability is increased by changing the shape of the AC adapter in accordance with the specification.

Figure 3:
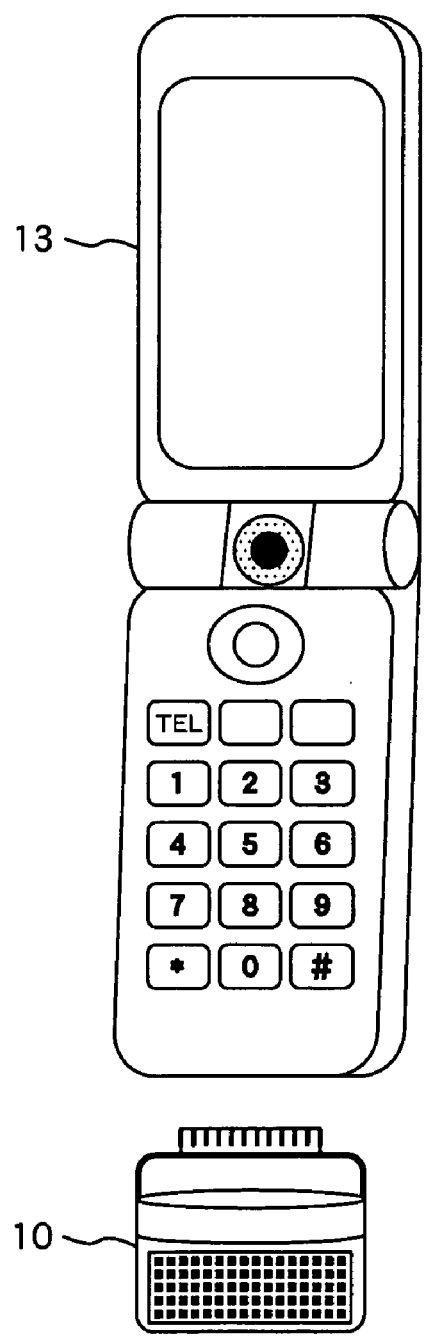
FIG. 3 is a perspective view of a mobile phone to which the present invention is applied.
Figure 4:
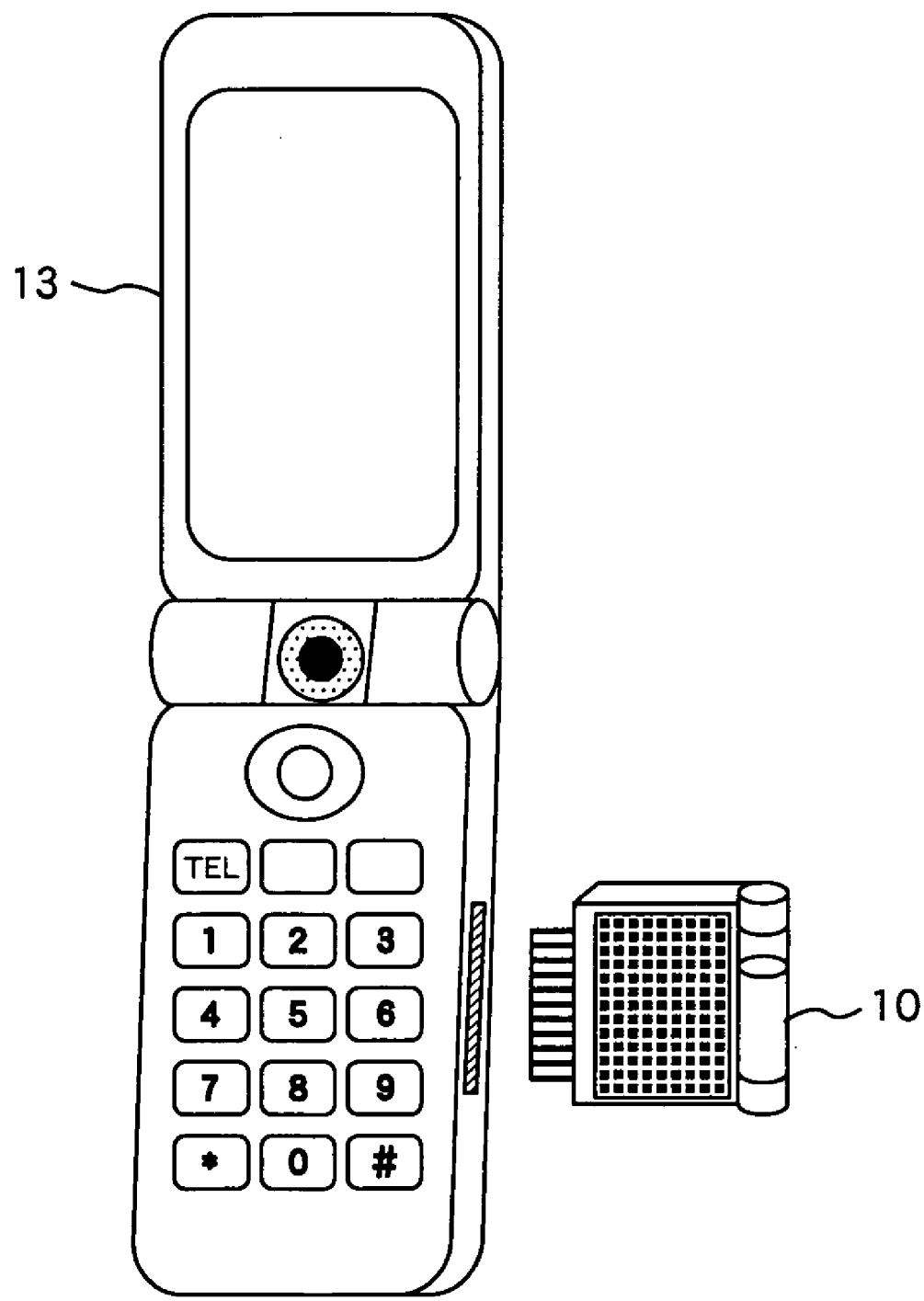
FIG. 4 is a perspective view of a mobile phone of another embodiment to which the present invention is applied.

FIGS. 3 and 4 show examples of mobile phones 13. A voltage such as 5.5 V, which is interchangeable with the AC adapter of the mobile phone is outputted from the DC/DC converter between the V+ and V− in FIG. 1, which are connecting terminals to the load. Using the construction shown in FIG. 6 in this embodiment, it is possible to increase interchangeability by employing output voltages and adapter structures in accordance with specifications, becomes the section of the electric power source apparatus 10 and the section of the AC adapter cable are separated.

Figure 5:
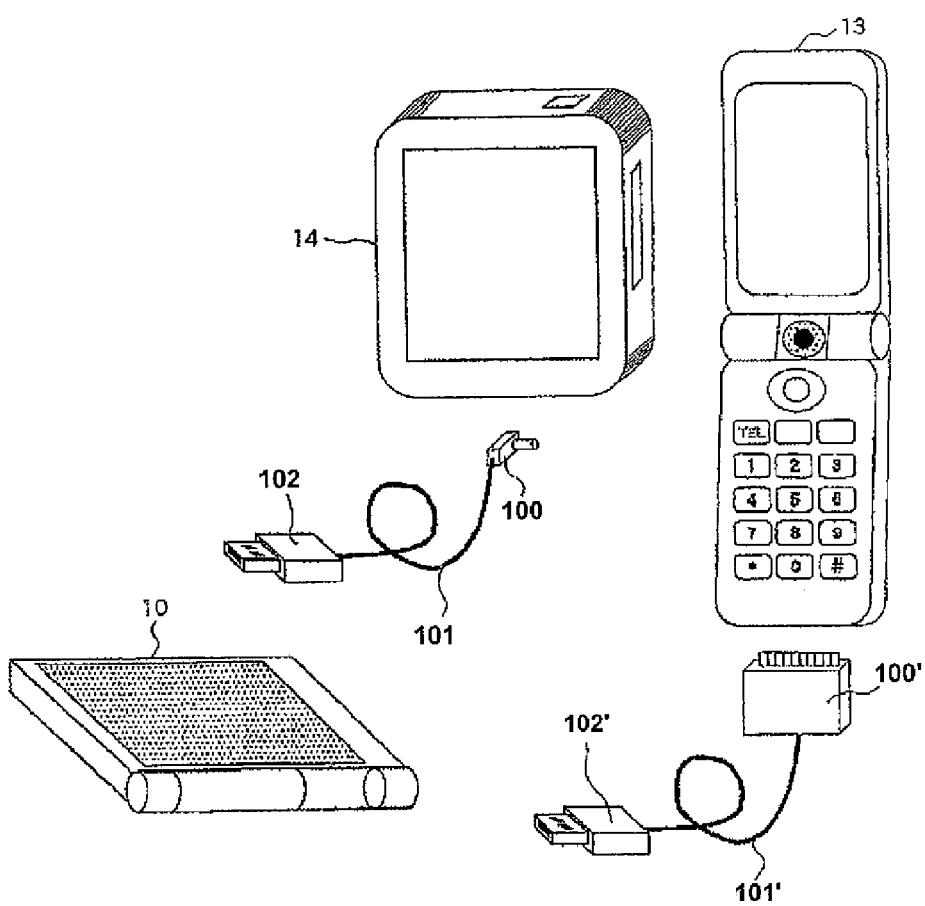
FIG. 5 is a perspective view of a mobile device charger, which is able to exchange a cable that uses a USB terminal.

FIG. 5 shows a case where a Li ion battery as the secondary battery is mounted on each of electronic devices 13 and 14. The Li ion battery has been used for the electronic device such as mobile phones 13, MD3 player, portable media player 14, etc. As shown in FIG. 5, interchangeably through each connection code (101, 101') with the output terminal (100, 101') with the output terminal (100, 100') and a connecting terminal (102, 102') at the electric power source 10. Each output terminal (100, 100') of the electric power source 10 can be connected to the charging terminal of the corresponding electronic device (13, 14) interchangeably, and the connecting terminals (102, 102') can be connected to the electric power source 10. Connecting terminals (102, 102') at the electric power source side are common terminals such as a USB terminal to each other, thereby the connection codes 101 and 101' are interchangeable to each other. A voltage of 5 V, which is interchangeable with the USB terminal is outputted from the DC/DC converter 5 between the V+ and V− shown in FIG. 1. The USB terminal is used not only as a power source socket, but also as a means for transmitting information on various data such as a fuel residual amount, power source code to the portable devices.

Next, the controlling means and controlling method will be explained. As the judging-controlling means, a one-chip microcomputer, an exclusive IC or a comparator is used. The judging-controlling means 3 is provided with an A/D terminal and an input/output terminal. As an input signal, there are voltage information of the EDLC 2 and various status judging signals, etc. As an output signal, there are an ON/OFF control signal to the load breaking switch 4 and ON/OFF control signal of the DC/DC converter.

In starting operation of the electric power source apparatus, a user controls the ON/OFF of the power source apparatus. The apparatus is provided with a main switch of which status is detected by the judging-controlling means 3. The supply of fuel or interchange of fuel cartridge is detected by the judging-controlling means 3. In case where fuel is directly supplied to fuel cell 1 by interchange of fuel by the user, the pressure rise in the fuel cell 1 is detected by the input terminal or A/D terminal of the judging-controlling means 3.

Figure 7:
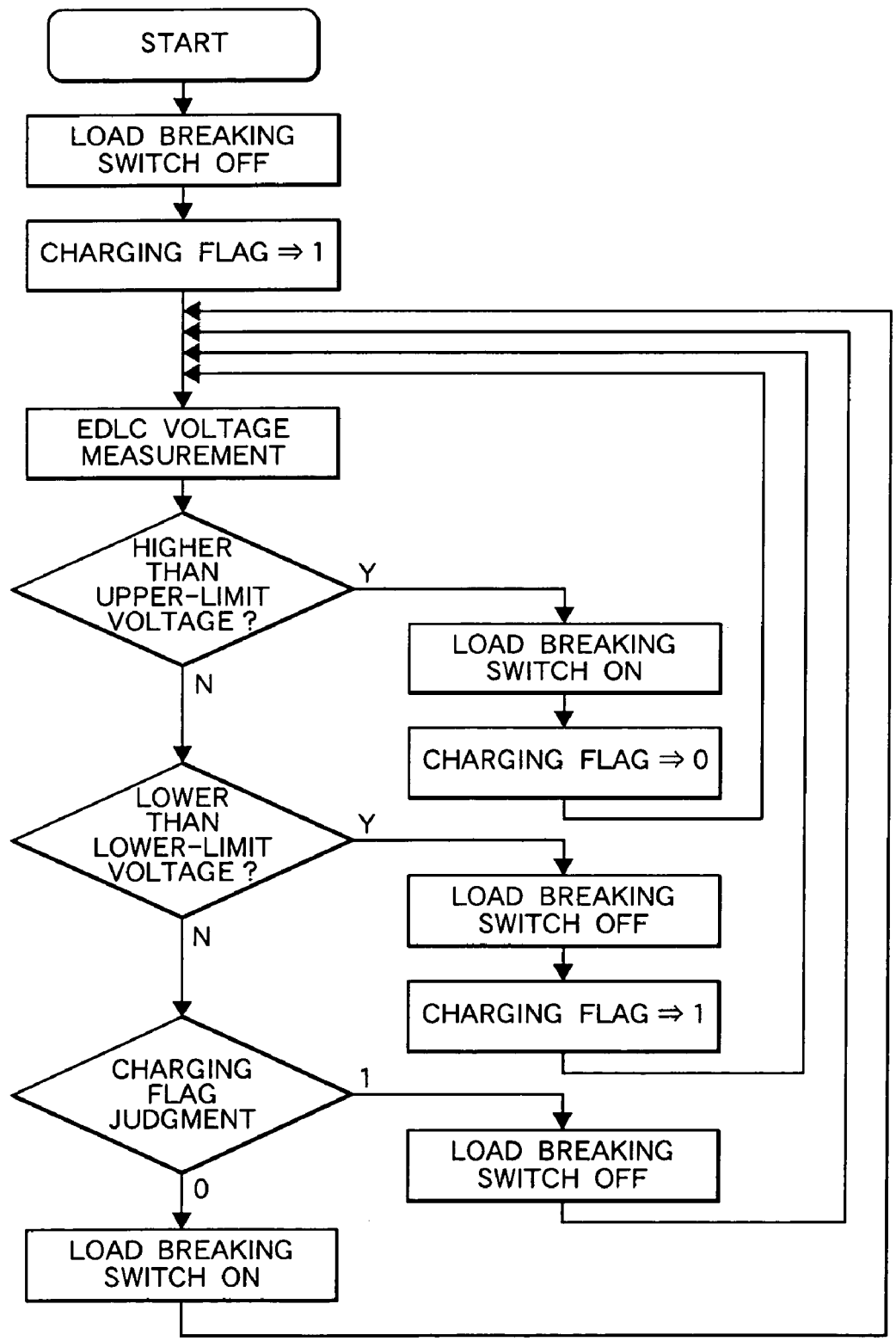
FIG. 7 is a flow chart for explaining the control of the electric power source apparatus of the present invention.
Figure 8:
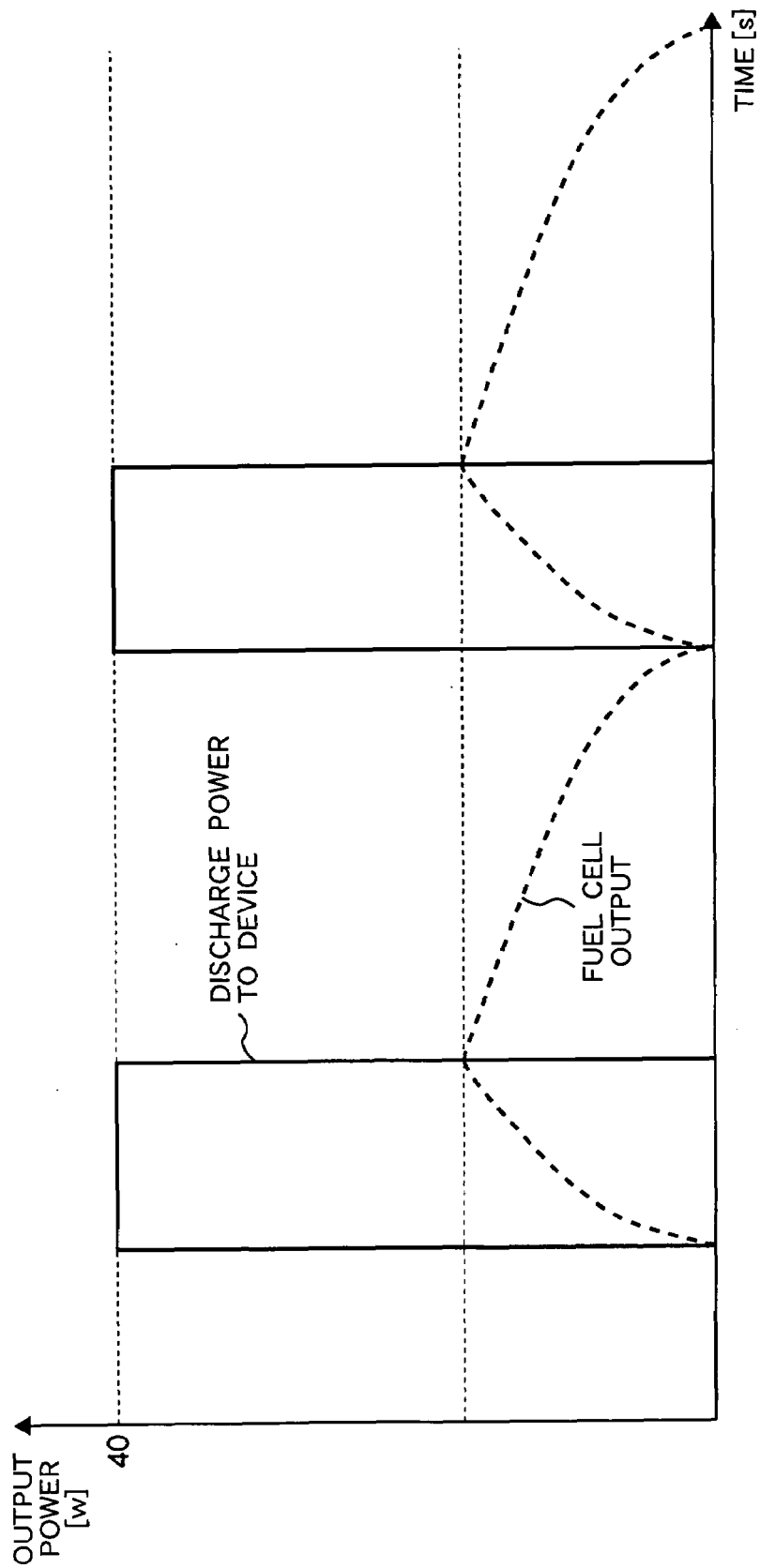
FIG. 8 is a chart showing electric power change of the fuel cell and EDLC of the electric power source apparatus of the present invention.

The normal operation will be explained by reference to FIGS. 7 and 8. When the voltage of EDLC 2 is detected by the A/D port of the judging-controlling means 3 to find that the voltage of the EDLC 2 is above the preset upper limit voltage, namely the voltage reaches an upper-limit threshold of a charging voltage of the EDLC 2, operation is shifted to a discharge control. The judging-controlling means 3 makes the DC/DC converter 5 ON to start a pressure elevation operation. Thereafter, the means makes the load breaking switch 4 ON to start supply of electric power to the electronic device. In this state, the fuel cell 1 and EDLC 2 become almost the same voltage at the electric power source side, whereby the electric power can be supplied in parallel. If the required power of the electronic device is larger than the supply power of the fuel cell 1, the voltage of the fuel cell 1 and EDLO 2 becomes down as the discharge time elapses.

Then, the judging-controlling means 3 detects that the voltage of EDLC 2 is lower than the preset voltage, namely the voltage reaches a lower-limit threshold of a discharge voltage of the EDLC 2 by the A/D port, followed by charging operation. The judging-controlling means 3 makes the load breaking switch 4 OFF to cut supply of electric power to the electronic device, followed by making the DC/DC converter 5 OFF. At this state, the electric power source is the charging operation from fuel cell 1 to EDLC 2, resulting in a voltage rise of the EDLC 2 as the charging time elapses. Then, when the voltage of the EDLC 2 becomes a voltage higher than the preset voltage, the above routine is repeated.

As a result of repetition of the routine, the electronic device recognizes as if a user inserted or withdrawn the AC adapter, and the electronic device conducts switching operation accordingly. Thus, the electronic device selects a control program or a capacitance of the EDLC 2 so as to make the routine sufficiently long such as one second or longer or 5 second or longer, thereby to prevent abnormal action, which may be caused by inputting ON/OFF signals of the AC adapter into the electronic device at a high speed.

By employing the above mentioned construction and controlling method, the fuel cell 1 should not be designed to have such the power generation area that the fuel cell can output a large power (40 W, for example) necessary for the mobile notebook PC. Accordingly, about 15 W of the output of the fuel cell, which is an average power of the mobile notebook PC, is designed. That is, when a capacity of the AC adapter of the mobile notebook PC is 40 W, the EDLC 2 outputs about 25 W, which is equivalent to a difference between the fuel cell output and the AC adapter of the notebook PC, for several seconds to several ten seconds. The capacity of EDLC necessary for the above output several hundred F is several ten cc in volume. When the capacity of the AC adapter is about 3 W, EDLC 2 should have several cc in volume to output about 2 W for several seconds to about ten seconds, which corresponds to several F to about ten F.

Figure 9:
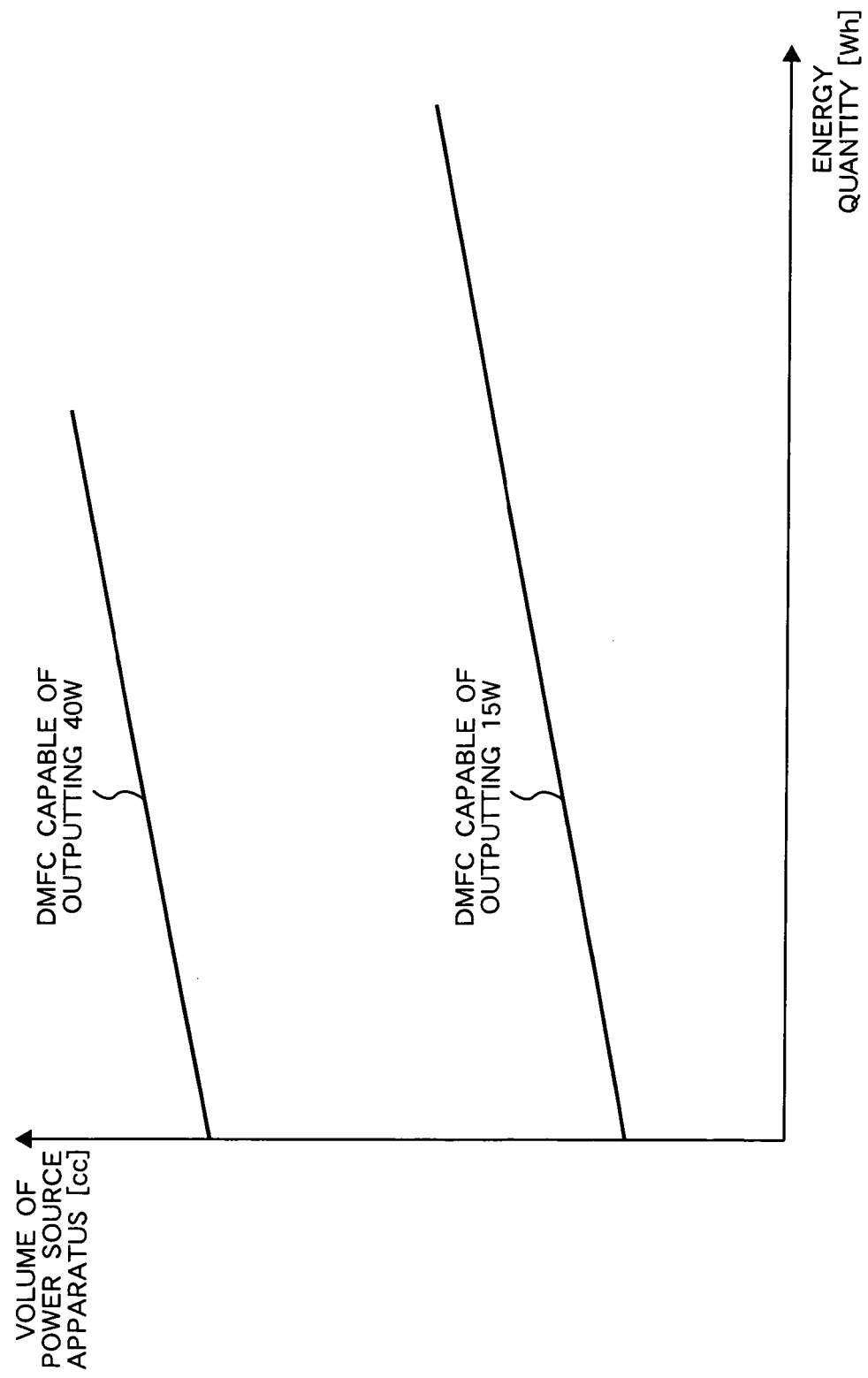
FIG. 9 is a chart showing a volume change in accordance with a design of electric power generation area of the fuel cell of the electric power source apparatus of the present invention.

Comparison of volumes between electric power sources are shown in FIG. 9. The intersected portion on the volume axis at the energy quantity of zero represents the volume of the electric power source only. By adding a fuel tank or a fuel cartridge necessary for power generation, an energy quantity increases in proportion to the volume of the fuel. As shown in FIG. 9, it is apparent that the electric power source can be made smaller sized and light-weighted by above system than that of the fuel cell can supply 40 W of the AC adapter capacitor or almost all of the AC adapter capacitor. Although the power generation section of the fuel cell 1 uses a noble metal such as platinum, ruthenium, etc, which is expensive, an amount of the noble metal can be reduced to one severalfold (1/several) thereby to cost down because the power generation can be reduced to one severalfold.

Embodiment 2

Figure 10:
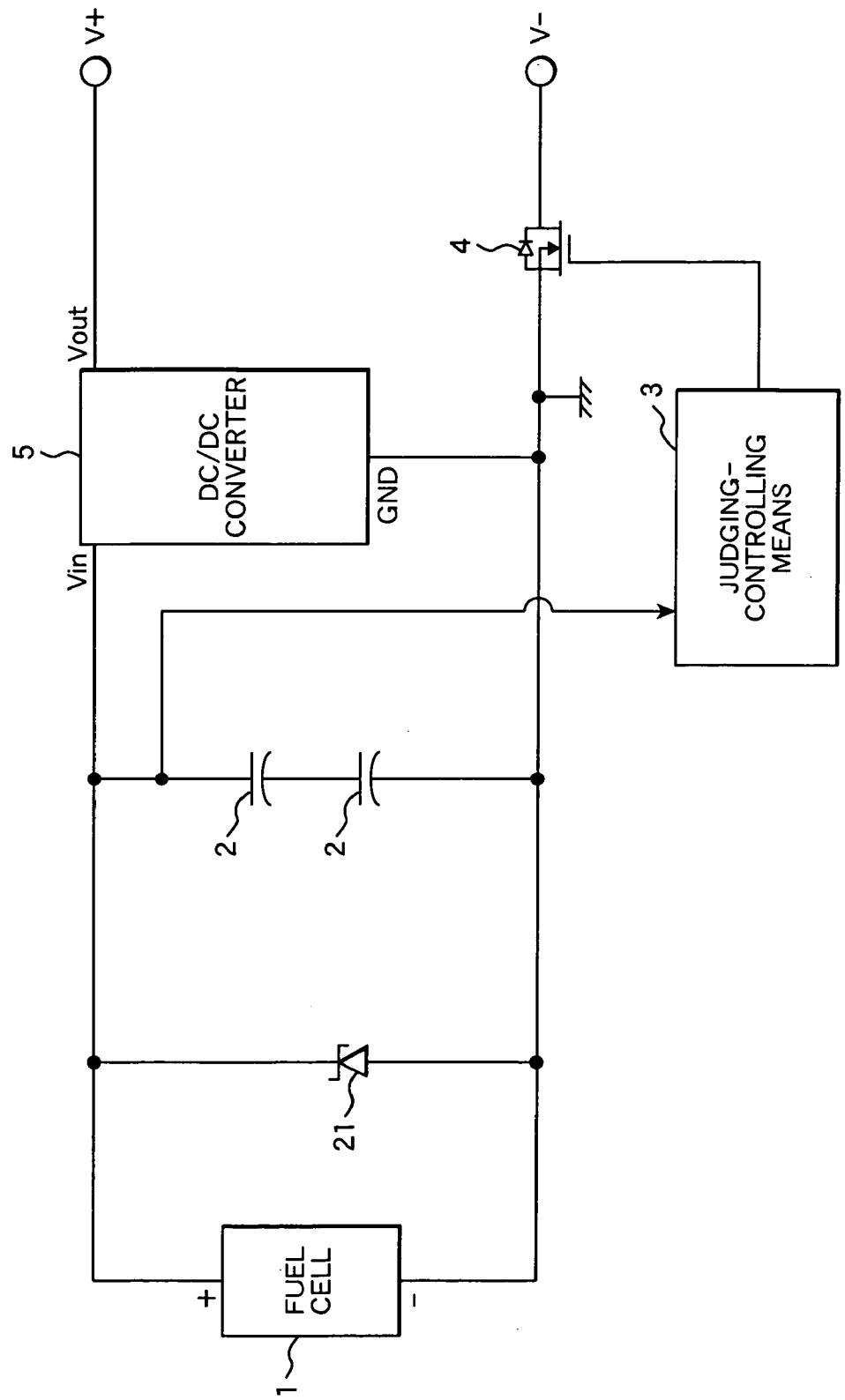
FIG. 10 is a circuit diagram of another embodiment of an electric power source apparatus of the present invention.

Embodiment 2 will be explained by reference to FIGS. 10 and 11. FIG. 10 is a block diagram of a circuit construction of the electric power source apparatus and connections of power lines and signal lines.

In case where a load on the fuel cell 1 is zero and the voltage becomes almost the natural potential, the voltage increases abruptly. In this embodiment, the system is provided with a function for cutting over-voltage to prevent damage of EDLC 2, which is caused by application of the over-voltage due to the increase of the voltage of the fuel cell 1 to the EDLC 2. As shown in FIG. 10, a constant voltage diode 21 is connected in parallel with the fuel cell thereby to cut a voltage applied to EDLC 2 to lower the voltage, which is lower than the withstanding voltage of EDLC 2. As shown in FIG. 11, the voltage higher than the preset voltage may be cut with a shunt regulator, or a resistor is connected in parallel with the fuel cell to realize the above mentioned function.

This embodiment greatly differs from embodiment 1 in a cell construction of the fuel cell 1 and EDLC 2. The maximum voltage per unit cell of the fuel cell 1 is 0.8 to 0.4 V by virtue of the voltage cutting function. It is preferable to design that the number of the fuel cells is 3 to 8 per one cell of EDLC 2. Accordingly, compared with embodiment 1, it is possible to design that the voltage difference between the upper limit and the lower limit of the charge-discharge of EDLC 2.

Figure 11:
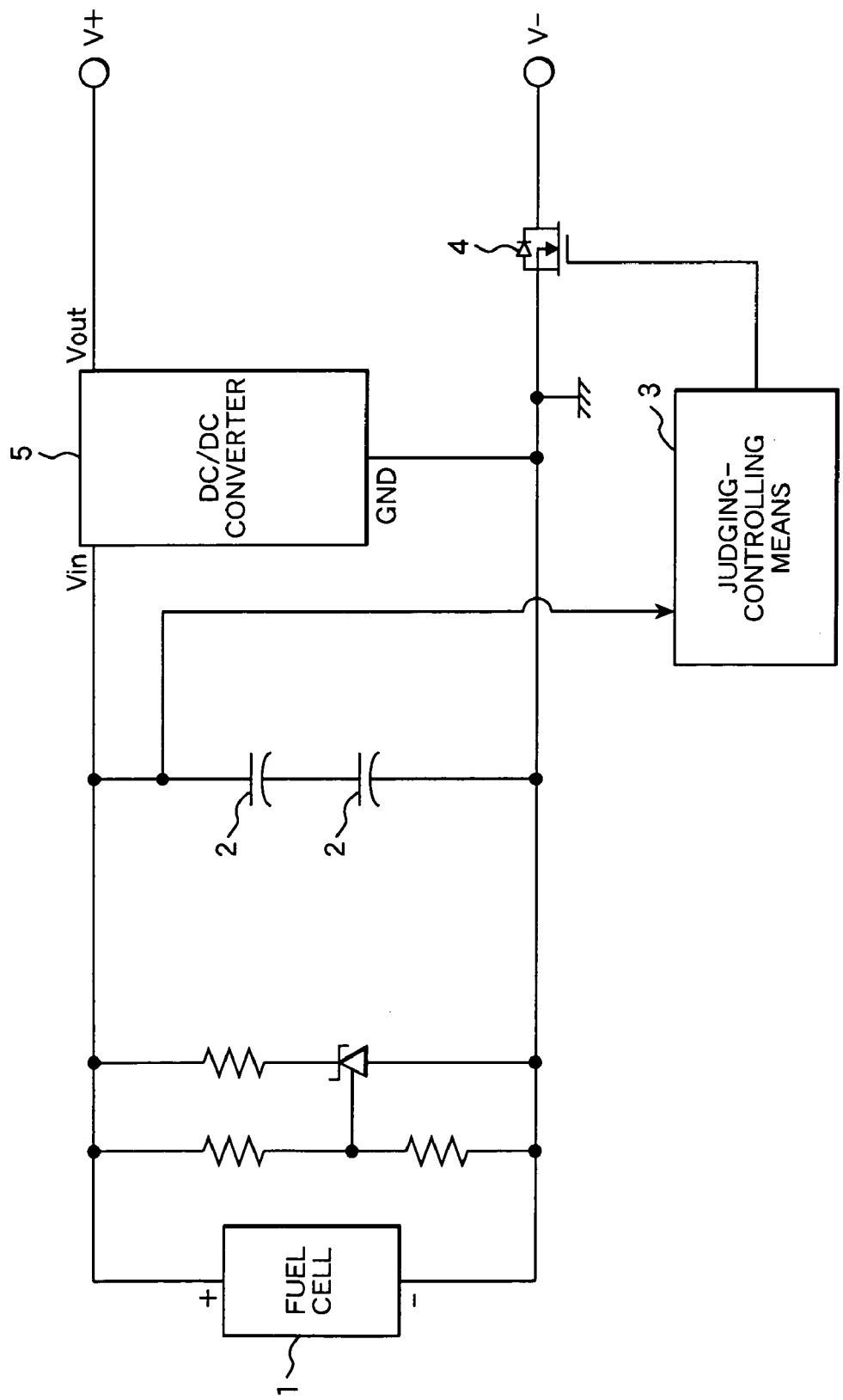
FIG. 11 is a circuit diagram of further another embodiment of an electric power source apparatus of the present invention.

Although not shown in FIGS. 10 and 11, a thermistor or a temperature sensor for measuring a temperature of the fuel cell may be provided to the fuel cell thereby to input sensor signals. When a temperature of the fuel cell elevates, the judging-controlling means controls to increase the lower limit voltage. The temperature rise of the fuel cell is proportional to quantity of current output from the fuel cell; when the lower limit voltage is increased, quantity of current outputted from the fuel cell is restricted so that an excessive temperature rise of the fuel cell is prevented.

Embodiment 3

Figure 12:
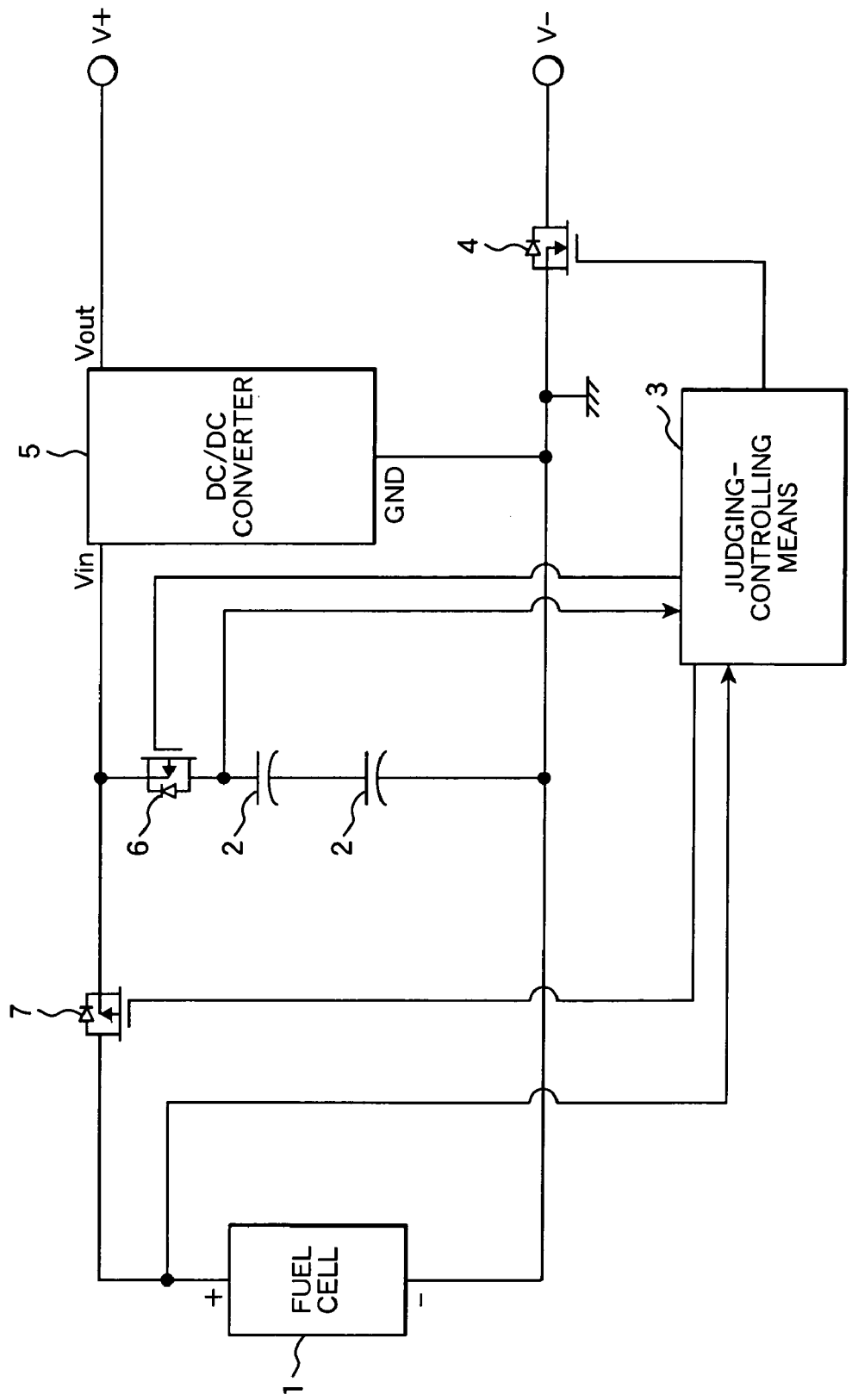
FIG. 12 is a circuit diagram of still another embodiment of an electric power source apparatus of the present invention.

Embodiment 3 will be explained by reference to FIGS. 12 to 14. FIG. 12 is a block diagram showing a construction of the electric power source apparatus and connections of power lines and signal lines.

In this embodiment, in addition to the embodiments, a power region of the fuel cell where charge from the fuel cell to EDLC becomes faster. That is, compared to embodiment 2, the electric power source apparatus is so designed that a quantity of current that the fuel cell can output in the upper limit preset voltage of EDLC becomes larger.

Figure 13:
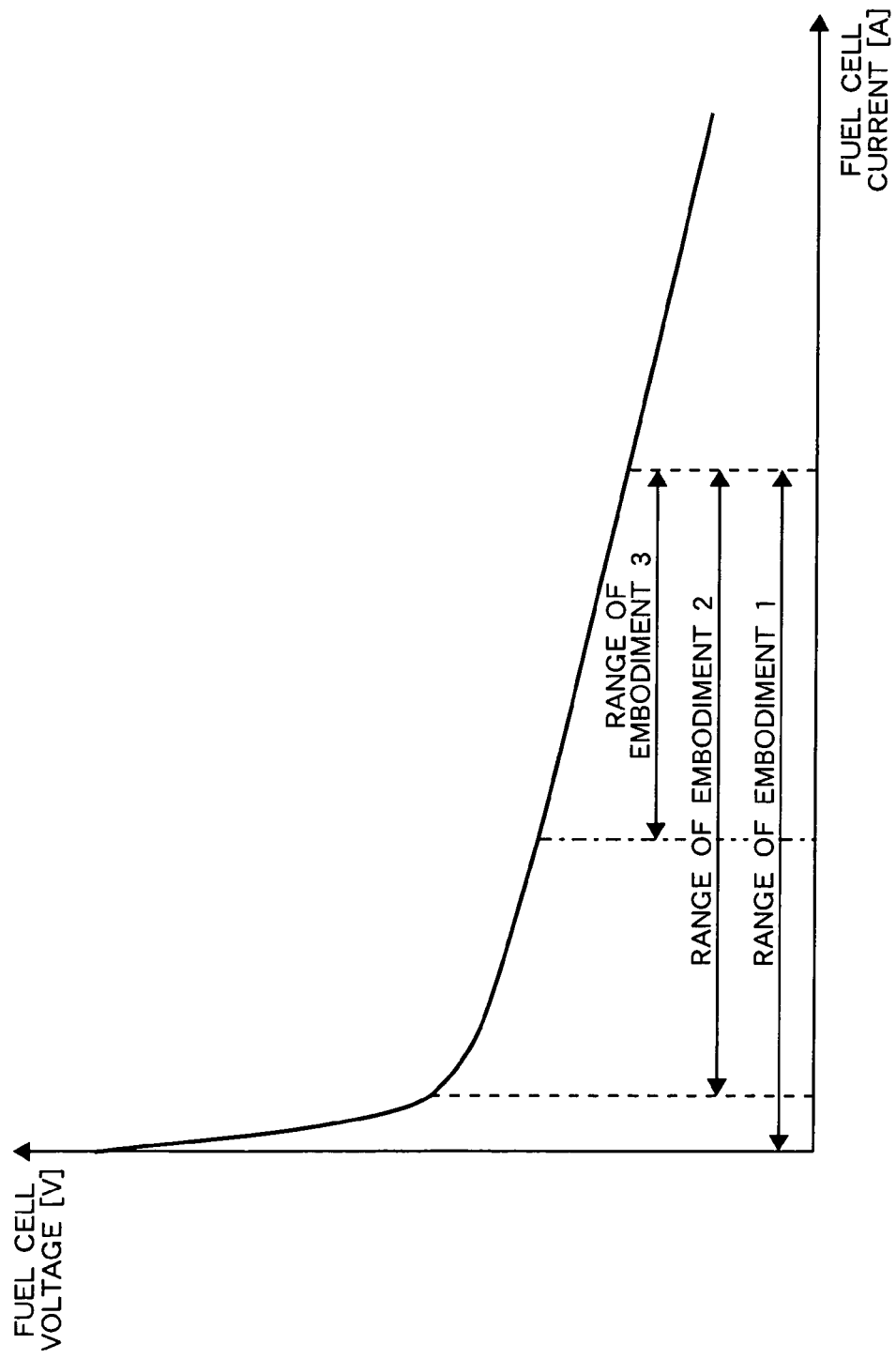
FIG. 13 shows a comparison among voltage designs of the fuel cells in the embodiments 1 to 3.
Figure 14:
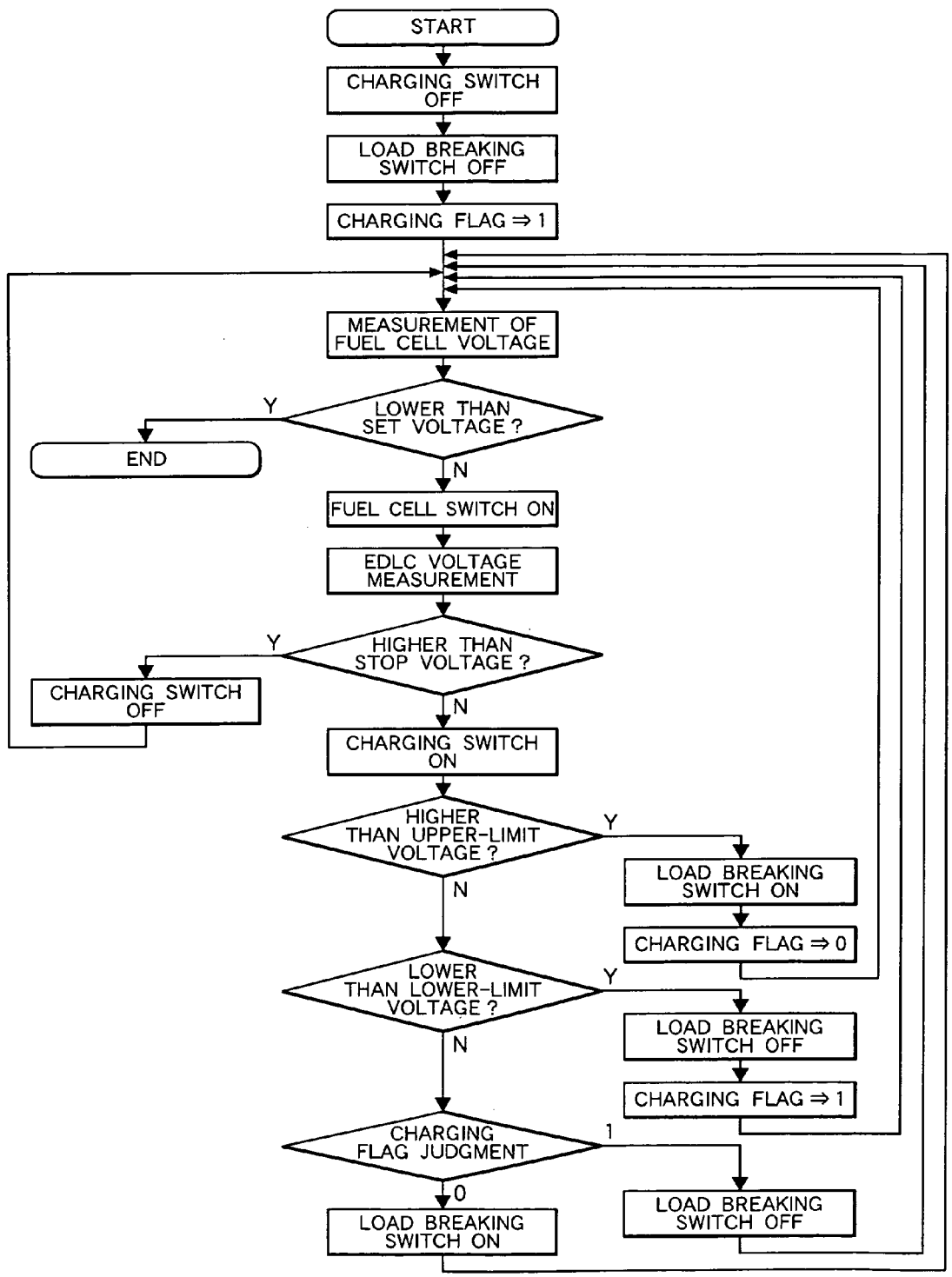
FIG. 14 is a flow chart explaining the control of the electric power source according to embodiment 3.

Comparisons of design ranges among embodiments 1 to 3 are shown in FIG. 13. The cell structure of the fuel cell and EDLC is changed in embodiment 3; the number of the fuel cells per one cell of EDLC is larger than that in embodiment 2. Accordingly, in the cell construction of this embodiment, there is an increased danger that voltage of the electric power source apparatus exceeds the withstanding voltage of the EDLC because the electric power source apparatus is not connected or the required electric power of the electronic device is very small. As a countermeasure to this ganger, the system is provided with an EDLC charging switch 6 that is capable of interrupting a charging path to the EDLC by using a P channel power MOS FET. Of course, it is possible to realize the function similar to one mentioned-above by employing a construction having two paths at the time of charging, which uses an N cannel power MOS FET at the GND side of the EDLC 2.

In this embodiment, there is provided a P channel power MOS FET as a fuel cell discharge switch 7 thereby to prevent backflow of current to lower a loss when the fuel in the fuel cell is zero, which may lead to backflow to the fuel cell or application of a reverse voltage to the fuel cell. In place of the above construction, a diode or a N channel power MOS FET at the GND side can be used. Further, the above elements may be omitted if there is no possibility of the backflow to the fuel cell because of a large self-discharge of EDLC.

Next, a difference of this embodiment from embodiment 1 will be explained. In embodiment 1, an additional judgment for the normal operation is introduced to embodiment 1. The normal operation in embodiment 3 will be explained by reference to FIG. 14.

A charge stop voltage is newly set to switch off the charging switch thereby to stop charging of EDLC 2 at the voltage value higher than the upper limit voltage of EDLC 2. As a result, it is possible to prevent damage to EDLC due to the voltage that exceeds the withstanding voltage of EDLC.

Embodiment 4

Figure 15:
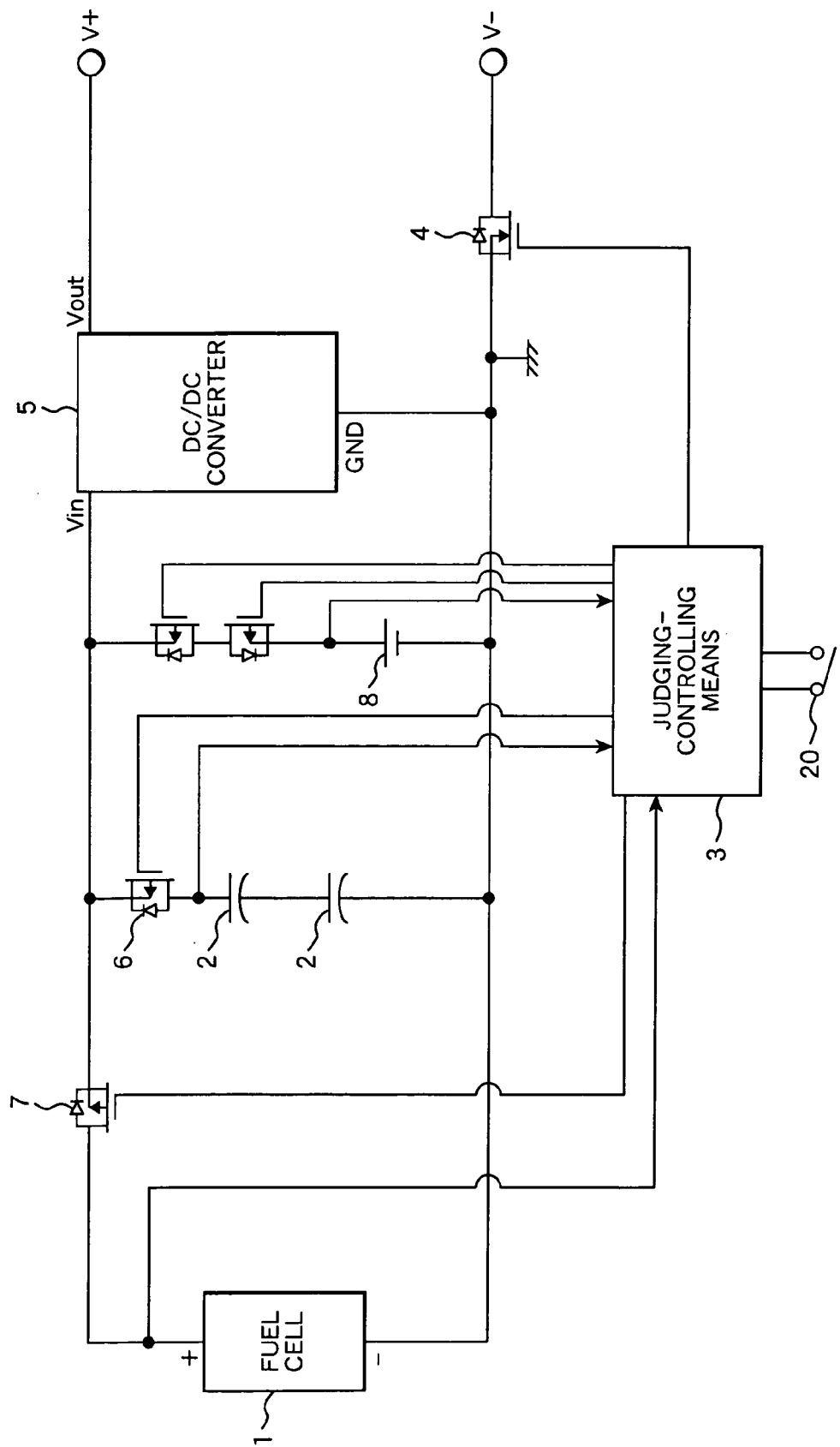
FIG. 15 is a circuit diagram of an embodiment of an electric power source apparatus according to the present invention.
Figure 16:
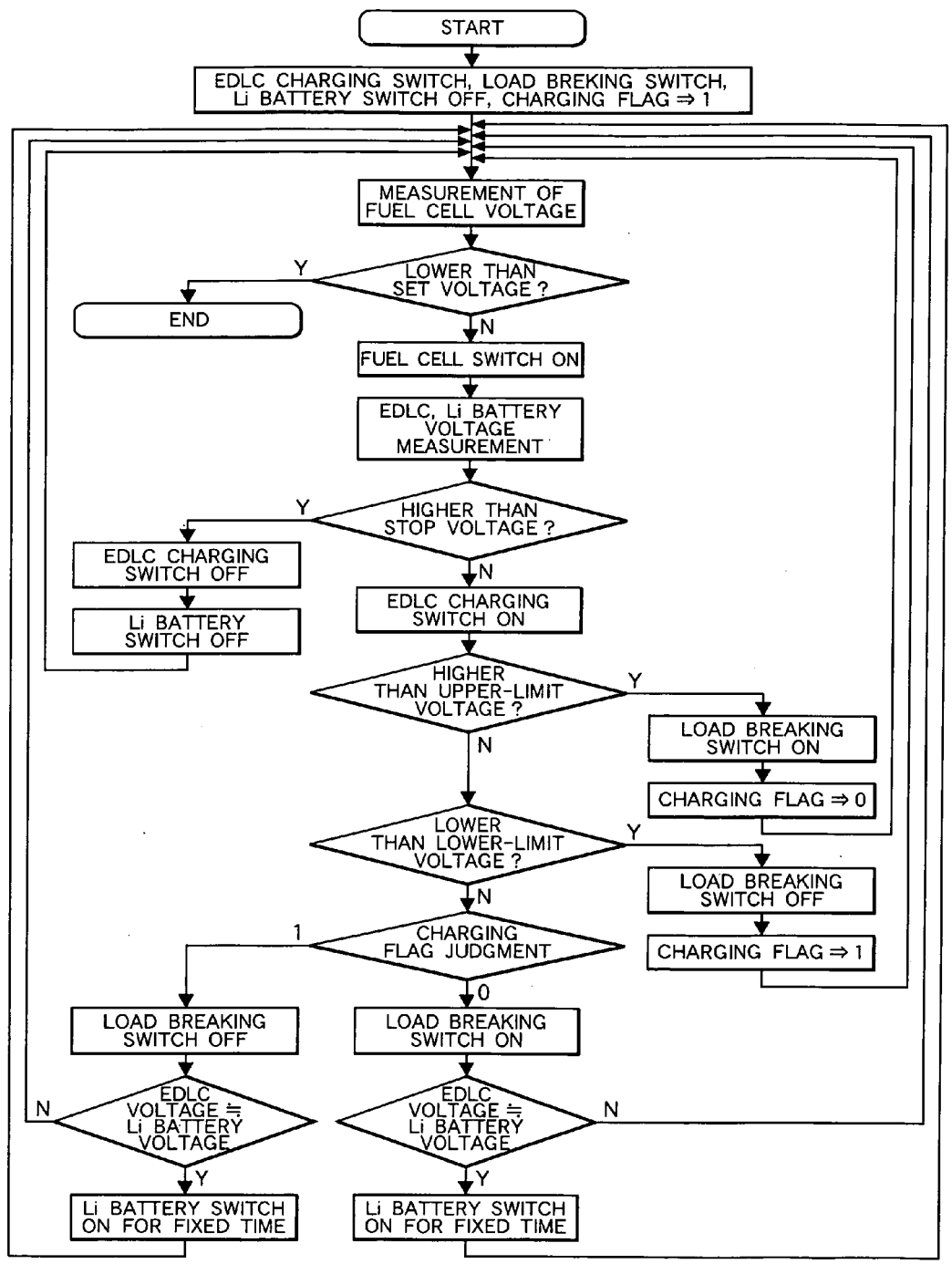
FIG. 16 is a flow chart for explaining the control of the electric power source apparatus of embodiment 4.

Embodiment 4 of the present invention will be explained by reference to FIGS. 15 and 16. FIG. 15 shows a construction of the electric power source apparatus and connections of power lines and signal lines.

In considering user's operation, there is an emergency case where a quick charging for preventing shutdown of the electronic device is needed when a residual energy amount of the battery mounted on the device is extremely small. The embodiment 4 has an additional secondary battery in addition to the construction of embodiment 2 so that the quick charging of the electronic device can be done. In this embodiment, the additional battery is a Li ion battery 8; a Ni hydrogen battery or other storage means may be employed, however.

The construction in this embodiment greatly differs from that of embodiment 2 in an emergency charging button 20 to be selected by the user, in addition to the additional battery. In this embodiment, a switch is employed; there is no limit as long as the judging-controlling means 3 can judge ON/OFF state. When the emergency charging button 20 is selected, discharging from the additional battery is carried out during the power supply to the electronic device thereby to make the power supply time longer. On the other hand, when the electric power supply from the additional battery to EDLC is done during the power supply to the electronic device is stopped, the power supply stop time is shortened. This means that the average supply power to the electronic device is increased.

Next, the operation in this embodiment will be explained by reference to FIG. 16. At first, operation of the power supply to the electronic device is explained. As shown in FIG. 16, the operation greatly depends on the state of the emergency charging button that is controlled by the user's operation. If there is no input of the emergency charging button, the operation is the same as in embodiment 1, the operation of which is switched by judgment of the preset lower limit voltage.

When there is an input of the emergency charging button, the operation is switched by comparing the voltages of EDLC and the additional secondary battery whose potentials are the same as that of the fuel cell because they output electric power in parallel. When the potential of the secondary battery is higher than that of EDLC, a discharge control of the secondary battery is not conducted. If the potential of EDLC is lower than that of the secondary battery, the secondary battery is conducted for a certain period of time. If the potential of the secondary battery is lower than the preset lower limit voltage, the operation becomes disable.

Next, the operation during the stop of power supply to the electronic device will be explained. As shown in FIG. 16, the operation is switched depending on whether the power supply time to the electronic device is within a certain period of time or not. If the power supply time is shorter than the certain time, the operation is the same as in embodiment 1; the operation is switched by the judgment of the preset upper limit voltage. If the power supply time is longer than the certain time, the operation is switched by comparing the voltages of EDLC charged with the fuel cell and the additional secondary battery. If the voltage of the secondary battery is higher than that of EDLC, charging control of the secondary battery is not conducted.

Figure 17:
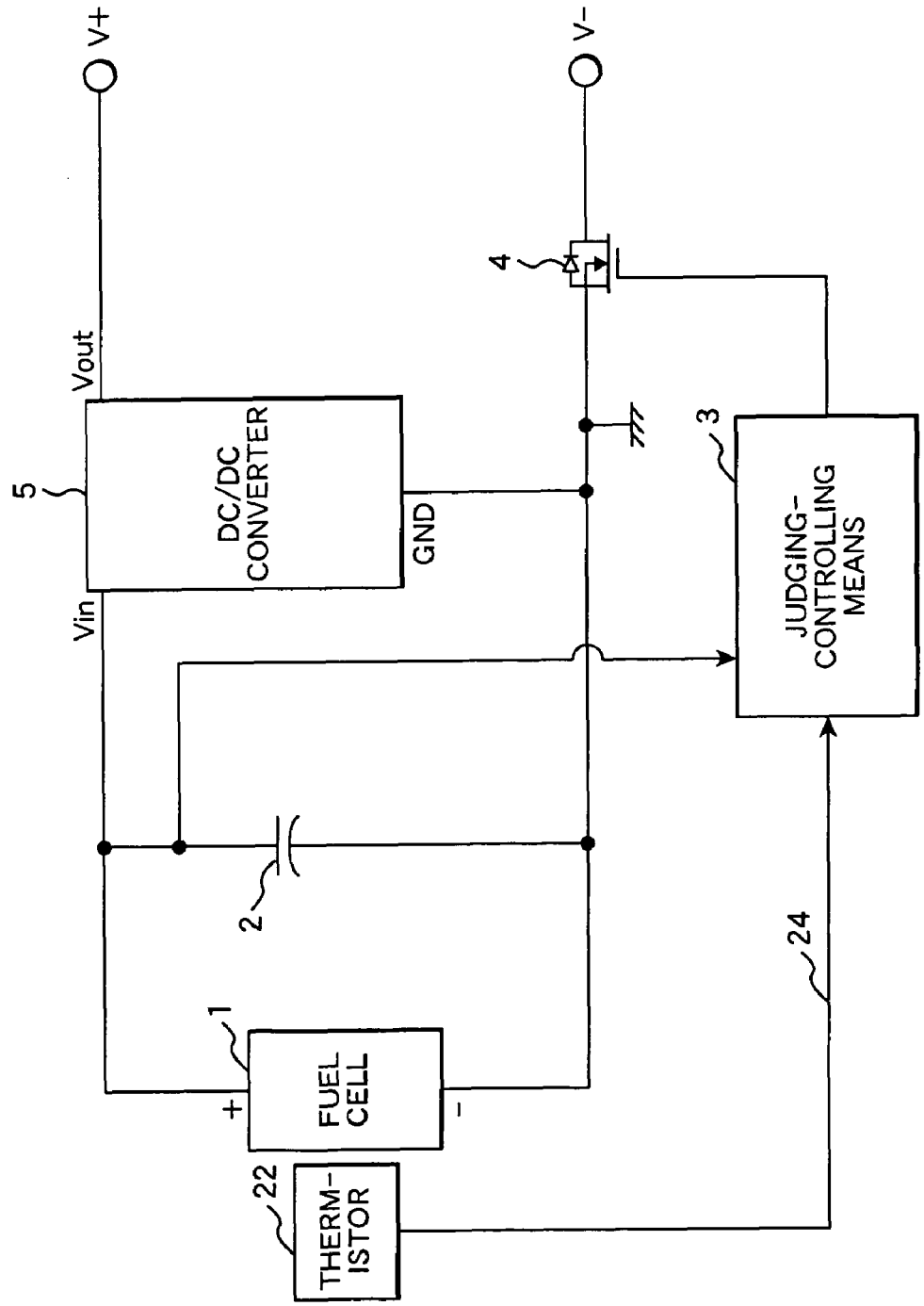
FIG. 17 is a circuit diagram of another embodiment of an electric power source apparatus of the present invention.

Another embodiment will be explained by reference to FIG. 17. FIG. 17, which is an improvement of the electric power source apparatuses shown in FIGS. 10 and 11, is a block diagram showing an outline of the electric power source apparatus and connections between power lines and signal lines. Unless otherwise specified, the same numerals in FIG. 17 as those in FIGS. 10 and 11 indicate the same elements, which have the same functions.

The constitution of the electric power source apparatus in this embodiment comprises a thermistor 22 as a temperature sensor for detecting temperature condition of the fuel cell 1, the thermistor being disposed near the fuel cell 1; temperature signals 24 generated by the thermistor 22 are input in the judging control means 3. The judging-controlling means 3 controls to increase the lower limit set voltage VL at the time of discharging of EDLC and the set upper limit voltage VH at the time of charging, in accordance with the preset program or the circuit operation when the fuel temperature elevates.

Upon the conditions of current quantity, it is possible to change only the lower limit set voltage or the upper limit set voltage.

Figure 18:
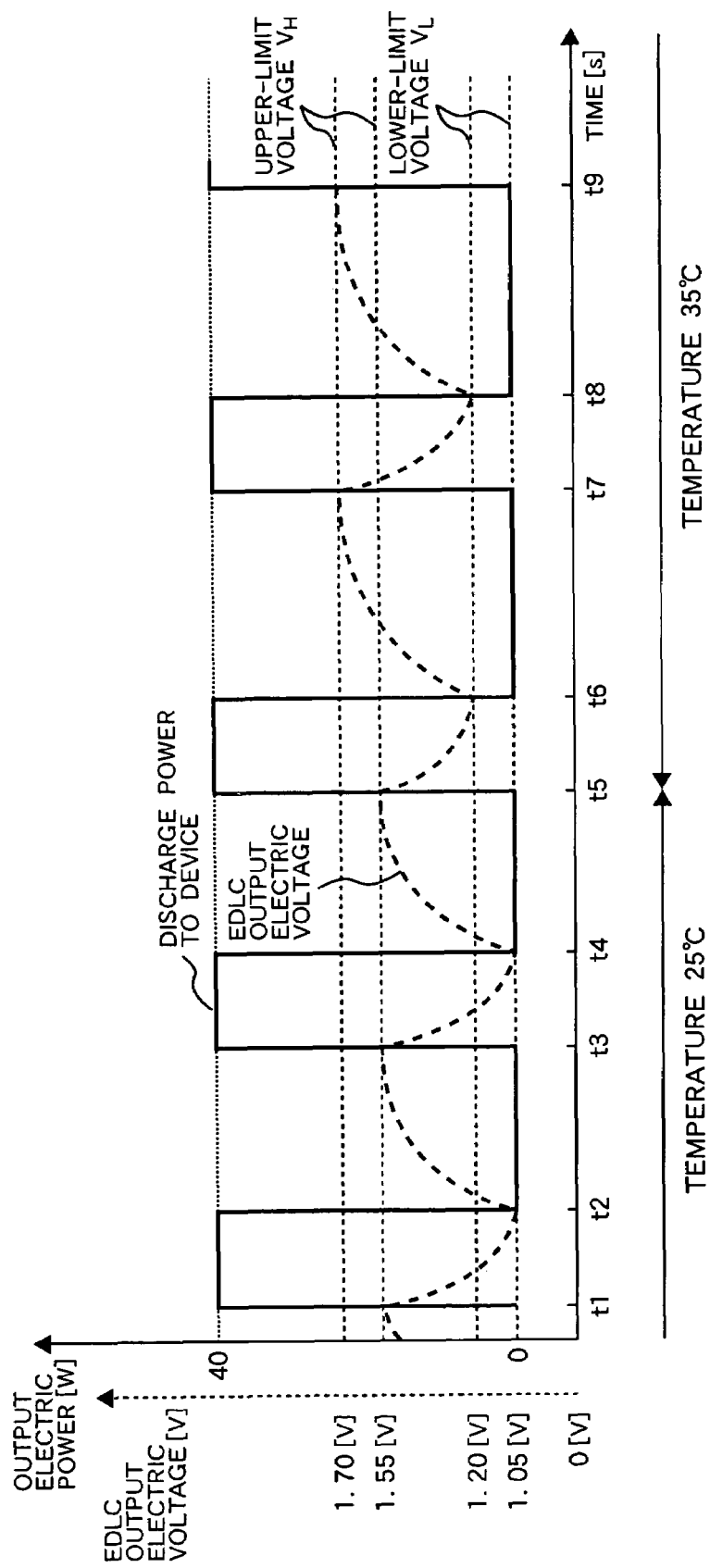
FIG. 18 is a chart showing electric power change of the fuel cell and EDLC of the electric power source apparatus of the present invention.

FIG. 18 shows change of output voltage of the electric power source apparatus and output voltage of EDLC of the electric power source apparatus shown in FIG. 17, wherein the set voltage is varied in accordance with the temperature condition of the fuel cell. FIG. 18 shows that the temperature of the fuel cell 1 is 25° C. until time t5, and the temperature changed to 35° C. after time t5.

As shown in FIG. 18, although the output voltage of EDLC shown by dotted lines changes within a range between the lower limit voltage VL 1.05 V and the upper limit voltage VH 1.55 V until the time t5, the output voltage of EDLC changes within a range between the lower limit voltage VL 1.20 V and the upper limit voltage VH 1.70 V in response to the temperature elevation of the fuel cell after the time t5. By this controlling, the temperature elevation of the fuel cell is almost proportional to the quantity of current outputted from the fuel cell; upon increase in the lower limit set voltage VL, the quantity of current outputted from the fuel cell is controlled so that the excessive temperature elevation of the fuel cell is prevented.

Further, as shown in FIGS. 17 and 18, it is possible to control the quantity of current outputted from the fuel cell by increasing the upper limit set voltage VH; with regard to the period of storing electric charges in EDLC, the judging-controlling means 3 controls the load breaking switch 4 so as to make the period for storing electric charges in EDLC of t6-t7 and t8-t9 at 35° C. longer than the period for storing electric charges in EDLC of t2-t3 and t4-t5 at 25° C. so that a constant electric power is supplied to external devices by discharging EDLC.

When it is not intended to supply the constant electric power to the external devices, it is possible that the upper limit set voltage VH is not increased or the period for electric charges in EDLC is not changed.

If the temperature of the fuel cell 1 excessively increases, such as 40° C. or higher, the thermistor 22 detects the temperature to input the detected temperature in the judging-controlling means 3 thereby to make OFF the load breaking switch 4 to stop taking out current from the fuel cell 1. As a result, by detecting the temperature condition of the fuel cell, electric power is taken out to let the fuel cell stabilize.

Next, the detailed constitution of the electric power source according to the present invention will be explained by reference to FIG. 19.

Figure 19:
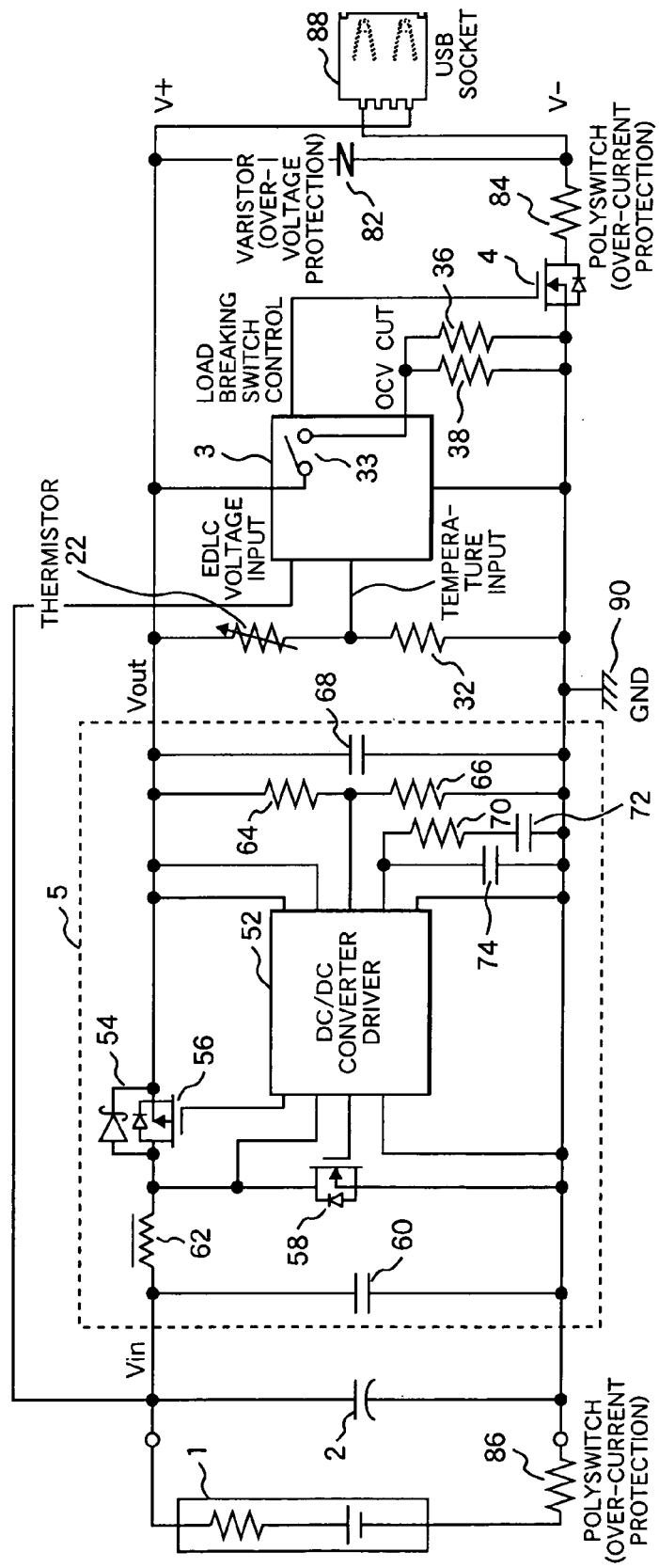
FIG. 19 is a detailed circuit diagram of another embodiment of an electric power source apparatus of the present invention.

FIG. 19 shows a circuit constitution of a circuit comprising DC/DC converter 5 and judging-controlling means and operation of the circuit. DC/DC converter 5 comprises DC/DC converter driver 52, which is semiconductors for control, and a smoothing condenser 60 disposed between an input terminal Vin from the fuel cell and GND 90. A choking coil 62 is connected to an output side of the smoothing condenser 60, and MOSFET 56 is connected to an output side of the choking coil 62. Further, MOSFET 58 is connected between the output side of the choking coil 62 and GND 90. The DC/DC converter driver 52 controls ON, OFF of the MOSFETs 56, 58.

A Zener diode 54 is connected to MOSFET 56 in parallel. Resistors 64, 66 and the smoothing condenser 68 for detecting a divided voltage to detect an output voltage at the output side of the DC/DC converter driver 52 are disposed. The DC/DC converter driver 52 detects the divided voltage by the resisters 64, 66 to controls ON, OFF states of MOSFETs 56, 58 thereby to control voltage and current states of the output Vout of the DC/DC converter 5.

The judging-controlling means 3 detects divided potential condition of the thermistor 22 as a temperature sensor disposed near the fuel cell 1 and the resistor 32 thereby to detect and input the temperature condition of the fuel cell 1. The circuit is provided with the load breaking switch 4 constituted by MOSFET, and the judging-controlling means outputs signals for controlling ON, OFF of the load breaking switch 4. Further, the circuit is provided with the resistors 36, 38, and the judging-controlling means 3 makes switch 33 on to cut the open circuit voltage.

In this electric power source apparatus, there is disposed at the output side of the fuel cell a polyswitch 86 for protecting the electric power source apparatus from over current. Further, a polyswitch 84 and a varistor 82 are disposed near the output terminals V+, V– of the electric power source apparatus for protecting the electric power source apparatus from over voltage.

Figure 20:
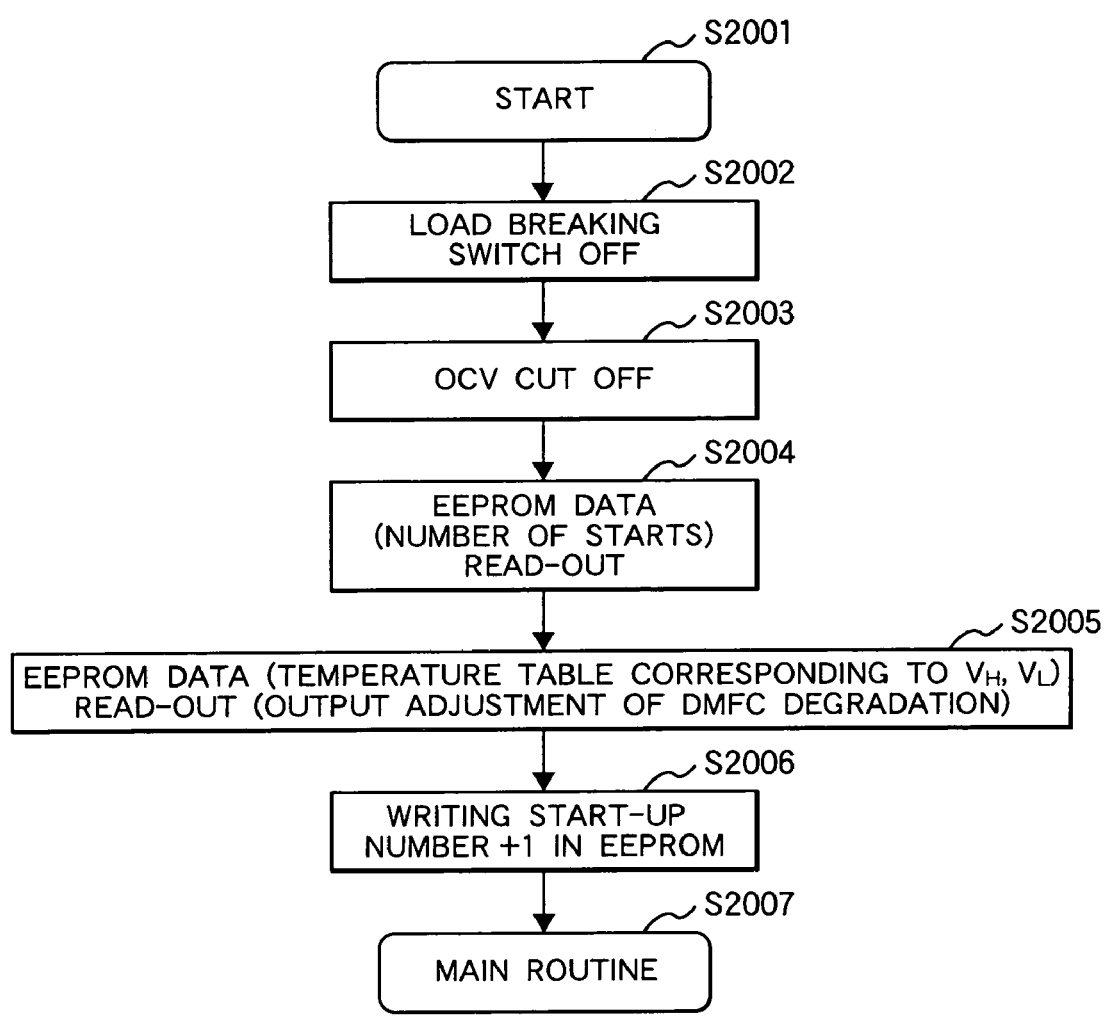
FIG. 20 is a flow chart for explaining the control of the electric power source apparatus of the present invention.

Next, an example of the start routine of the electric power source apparatus of the present invention will be explained by reference to FIG. 20. The operation is started at step S2001. At step S2002, the judging-controlling means 3 sends signals to MOSFET of the load breaking switch to make the switch OFF. At step S2003, the judging-controlling means 3 makes the switch 33 OFF thereby to stop the cut state of the open circuit voltage.

At step S2004, the judging-controlling means 3 reads out data on the number of starts from EEPROM of the memory means installed in the judging-controlling means 3. At step 2005, the judging-controlling means 3 reads out data of the temperature table of the upper limit voltage VH and the lower limit voltage VL of EDLC corresponding to the number of starts from EEPROM, thereby to adjust the output so that the upper limit voltage VH and the lower limit voltage correspond to the degradation (operation number) of the fuel cell (DMFC).

At step S2006, the number of starts increased by 1 is recorded in EEPROM, and then the start routine is ended at step S2007. According to the above routine, it is possible to output a stable electric power in accordance with the number of starts of the fuel cell, even if the fuel cell is started.

Figure 21:
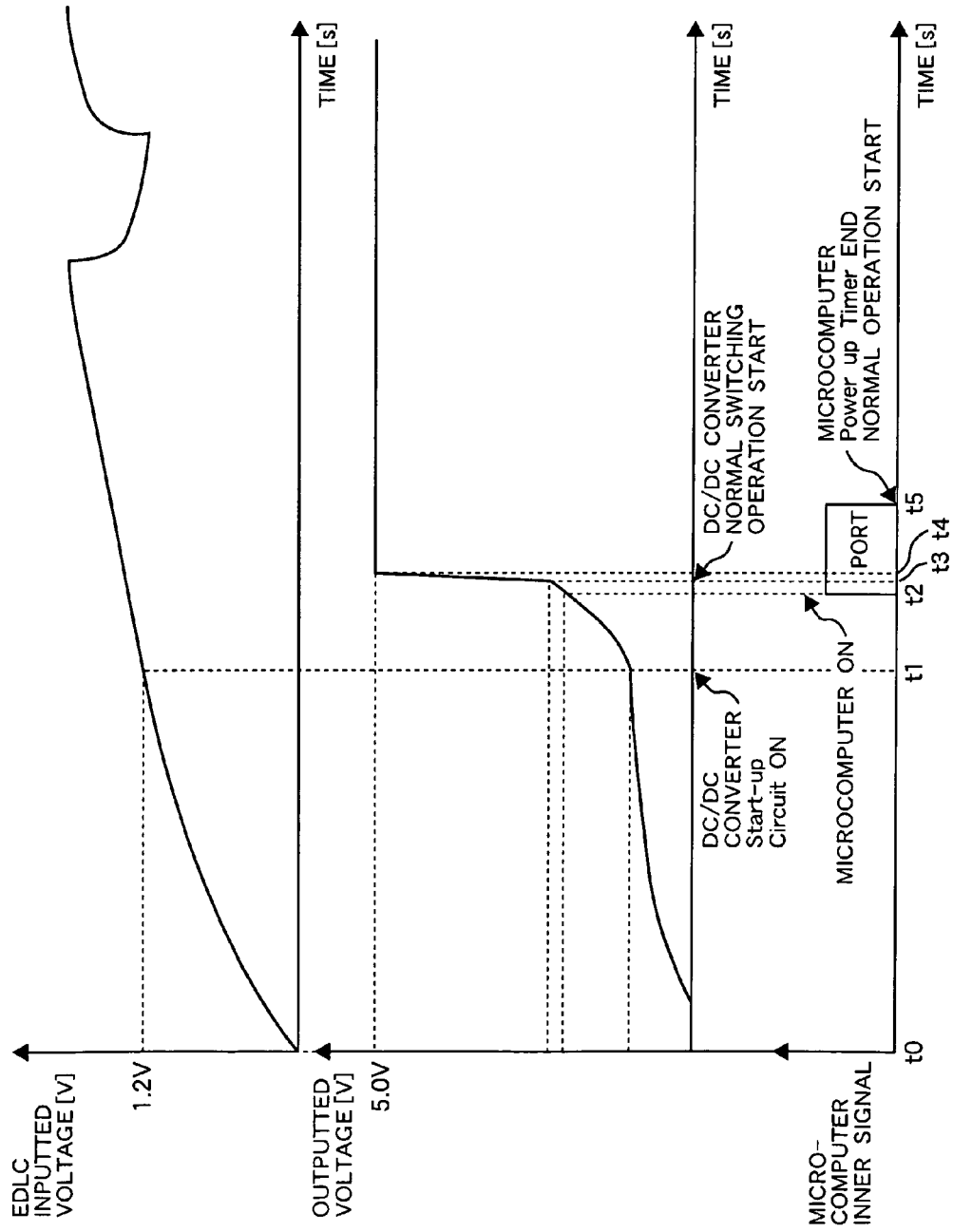
FIG. 21 is a diagram for explaining a controlling operation at the time of start of the electric power source apparatus.

Next, FIG. 21 shows another example of a start routine of the electric power source apparatus of the present invention. This figure shows a time-change of an input voltage of EDLC after the start of the electric power source apparatus, an output voltage of the apparatus, operation signals of the microcomputer provided to the judging-controlling means 3. The fuel cell 1 is started at t0 to flow current to EDLC thereby to store electric charges. At time t1, a start-up circuit of the DC/DC converter 5 is made ON in such a state that the microcomputer provided to the judging-controlling means is not operated, when the input voltage becomes 1.20 V. At time t2, a power up timer of the microcomputer provided to the judging-controlling means 3 is started. At time t3, the DC/DC converter 5 starts normal switching operation to abruptly increase the output voltage of the electric power source apparatus, and at time t4 the voltage of the apparatus becomes 5.0 V. Thereafter, at time t5, the power up timer of the microcomputer provided to the judging-controlling means is ended to start a normal operation. Thus, the electric power source apparatus is controlled to output a stabilized voltage. According to the above procedures, it is possible that the electric power source apparatus outputs the stable voltage from the state where the fuel cell is not operated.

Figure 23:
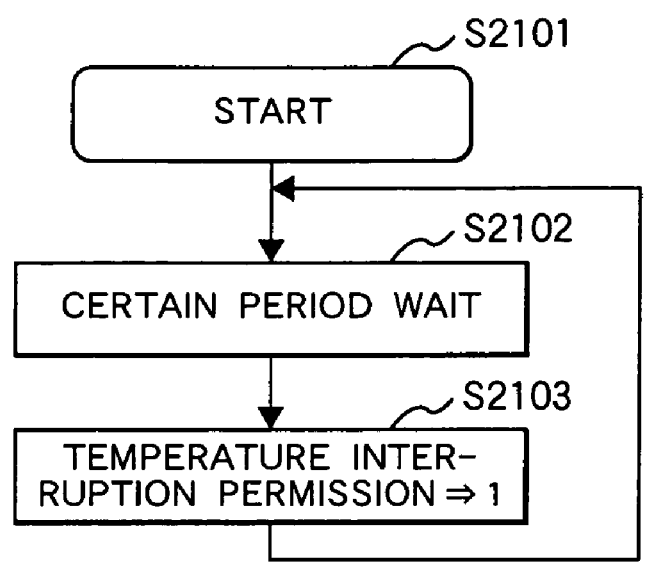
FIG. 23 is a flow chart for explaining the controlling method according to the present invention.

Next, FIG. 23 shows a main treating routine for taking out electric power from the electric power source of the present invention. At step S2101, the main treating routine starts. At step S2102, staying is carried out for a certain time period. At step S2103, the temperature condition of the fuel cell 1 is monitored; if the temperature drastically elevates, temperature interruption permission flag is made (1), and the control interruption based on temperature to the electric power source apparatus is done. According to the above procedures, it is possible to output the stable electric power, based on the temperature condition of the fuel cell, even when electric power is outputted from the fuel cell.

Figure 22:
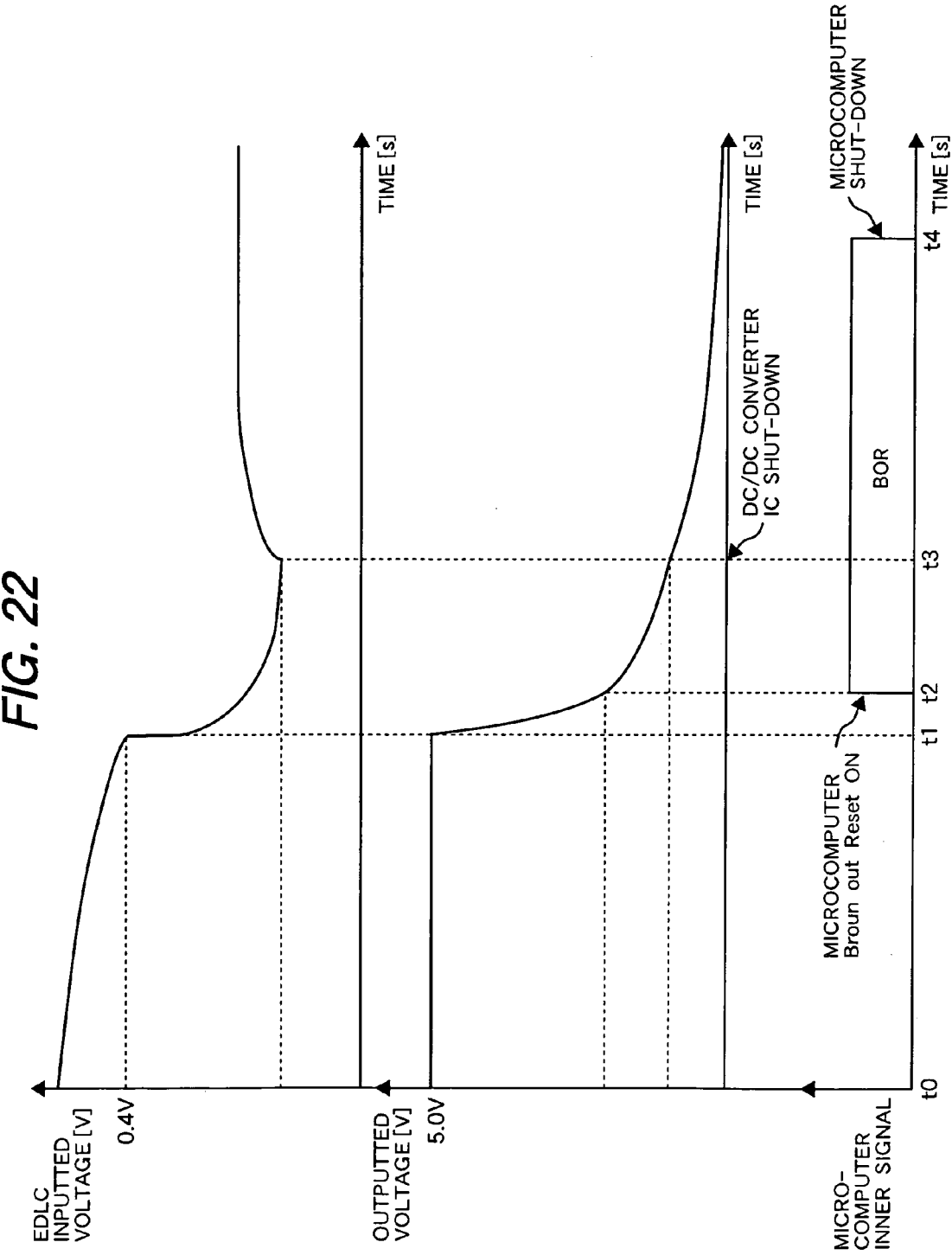
FIG. 22 is a diagram for explaining a controlling operation at the time of stop of the electric power source apparatus.

Next, FIG. 22 shows an ending routine of the electric power source apparatus. This figure shows a flow chart for explaining a control method of the electric power source apparatus. This figure shows a change of the input voltage of EDLC, the output voltage of the electric power source apparatus and inner signals of the microcomputer provided to the judging-controlling means 3 at the time of ending of operation of the apparatus. At time t0, the fuel cell 1 is stopped to stop flow current to EDLC; and stop storing electric charges. At time t1, the input voltage of EDLC becomes 0.40 V so that the output voltage of 5.0 V is not maintained. At time t2, the output voltage further lowers; Broun out Reset circuit of the microcomputer provided to the judging-controlling means 3 is made ON at this time. Thereafter, the output voltage lowers further, and at time t3, the microcomputer provided to the judging-controlling means is shut down. According to the above procedures, the electric power source apparatus can be stably stopped from the state where the fuel cell is operated.

Figure 24:
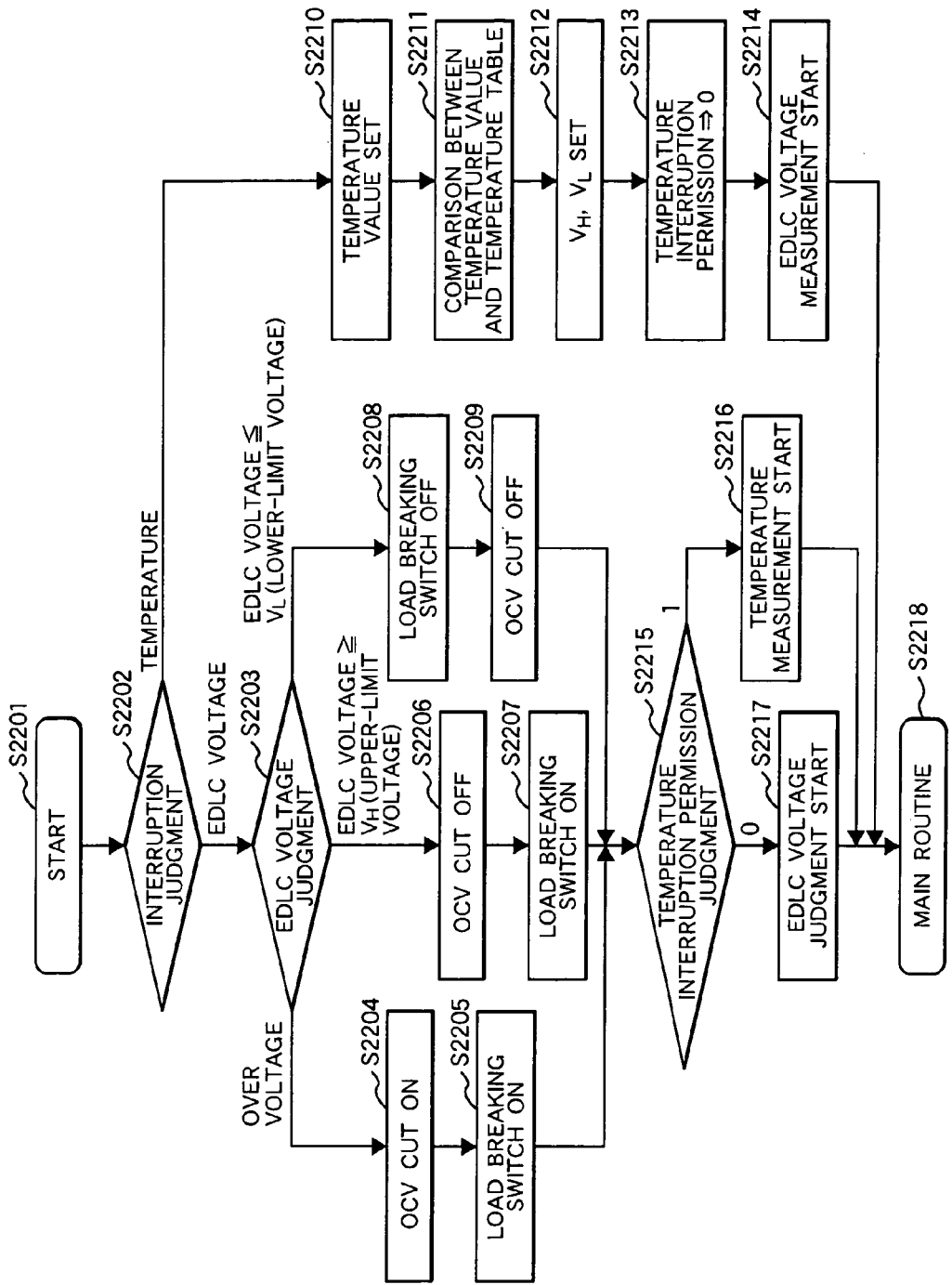
FIG. 24 is a flow chart for explaining the control of the electric power source apparatus of the present invention.

Next, FIG. 24 shows an interruption processing routine of the electric power source apparatus. At step S2201, the interruption processing starts. At step S2202, it is judged if interruption processing by temperature of the fuel cell occurs. If the interruption processing does not occur, a voltage of EDLC is judged at step S2203.

At step S2203, if the voltage of EDLC is judged as an over voltage, the judging-controlling means 3 makes the switch 33 for cutting the open circuit ON at step S2204. The judging-controlling means 3 sends signals to MOSFET 4 of the load breaking switch to make the load breaking switch ON, thereby to suppress the occurrence of the over voltage.

If the voltage of EDLC is a value higher than the upper limit voltage VH at step S2203, the judging-controlling means 3 makes OFF the switch 33 for cutting the open circuit voltage of the circuit connected to the resistors 36, 38. At step S2207, the judging-controlling means 3 sends signals to the load breaking switch 4 to make the load breaking switch ON, thereby to control the voltage of EDLC not to become the voltage higher than the upper limit voltage VH.

If the voltage of EDLC exhibits a voltage lower than the lower limit voltage at step S2203, the judging-controlling means 3 sends signals to the load breaking switch thereby to make the switch OFF at step S2209. If an interruption processing by temperature of the fuel cell 1 occurs at step S2202, a value of temperature of the fuel cell measured at step S2210 is set. At step S2211, comparison between the measured temperature and the temperature table in which the upper limit voltage VH and the lower limit voltage are stored. The temperature table is stored in a memory as a means for memorizing means disposed in the electric power source apparatus, wherein targeted upper limit voltage VH and lower limit voltage VL are stored.

At step S2212, the upper limit voltage VH and the lower limit voltage VL are set. At step S2213, the setting of the upper limit voltage VH and the lower limit voltage VL is ended, and the permission flag of temperature interruption is made (0) to stop the permission of interruption. At step S2214, measurement of the voltage of EDLC is started to control the voltage to be within a range of from the upper limit voltage VH and the lower limit voltage VL.

At step S2215, permission of temperature interruption is judged. At step S2217, if there is no permission judgment represented by flag (0) of the temperature interruption, measurement of the voltage of EDLC is started. At step S2216, if there is a permission judgment flag (1) measurement of temperature of the fuel cell is started. After the above described interruption processing at step S2218, the main processing routine shown in FIG. 21 is carried out.

According to the above construction, it is possible to stably supply electric power from the fuel cell even if abnormality of output voltage from the auxiliary electric power (EDLC) occurs, in a state where electric power is taken out from the fuel cell.

According to the embodiments of the present invention, it is possible to solve the problem that the fuel cell should have been a large sized when the exterior battery charger of the electronic device mounting the secondary battery is realized by the fuel cell.

What is claimed is:

1. A method of controlling an electric power source for supplying electric power to a charging terminal of an electronic device on which a secondary battery is mounted, wherein the electric power source is an external battery charger for the secondary battery of the electronic device and comprises a fuel cell and an auxiliary power source connected to the fuel cell in parallel and an output terminal of the electric power source can be connected to the charging terminal of the electronic device, the method comprising:

supplying the electric power to the charging terminal of the electronic device from the fuel cell and the auxiliary electric power source to charge the secondary battery by turning on the output terminal side of the electric power source at the time when a voltage of the auxiliary power source reaches an upper-limit threshold of a charging voltage of the auxiliary power source, interrupting the supply of the electric power to the charging terminal of the electronic device and charging instead the auxiliary electric power source from the fuel cell by turning off the output terminal side of the electric power source at the time when the voltage of the auxiliary power source reaches a lower-limit threshold of a discharge voltage of the auxiliary power source, repeating the turn-on and turn-off at the output terminal side of the electric power source, thereby supplying the electric power intermittently from the electric power source to the charging terminal of the electronic device to charge the secondary battery in direct current pulses, and increasing the lower-limit threshold value of the discharge voltage of the auxiliary electric power source in response to an elevation in temperature of the fuel cell.

2. The controlling method according to claim 1, wherein the upper threshold value of the charging voltage of the auxiliary electric power source is increased in response to the an elevation in temperature of the fuel cell.

3. The controlling method according to claim 1, wherein the auxiliary electric power source is an electric double layer condenser.

4. The controlling method according to claim 1, wherein data on the lower threshold value of the discharge voltage and/or the upper threshold voltage of the charging voltage of the auxiliary electric power source is memorized in a memory device, whereby the charging voltage of the auxiliary voltage is changed by means of the data.

5. An electric power source apparatus for supplying electric power to a charging terminal of an electronic device on which a secondary battery is mounted, wherein the electric power source is an external battery charger for the secondary battery of the electronic device, and an output terminal of the electric power source can be connected to the charging terminal of the electronic device, the electric power source comprising:

a fuel cell, an auxiliary electric power source functioning as a high output density power source, wherein the fuel cell and the auxiliary power source are connected to each other in parallel, and a controlling means that supplies electric power to the charging terminal of the electronic device from the fuel cell and the auxiliary electric power source to charge the secondary battery of the electronic device by turning on the output terminal side of the electric power source at the time when a voltage of the auxiliary power source reaches an upper-limit threshold of a charging voltage of the auxiliary power source, interrupts the supply of the electric power to the charging terminal of the electronic device and, charges instead the auxiliary electric power source from the fuel cell by turning off the output terminal side of the electric power source at the time when the voltage of the auxiliary power source reaches a lower-limit threshold of a discharge voltage of the auxiliary power source, and increases the lower-limit threshold value of the discharge voltage of the auxiliary electric power source in response to an elevation in temperature in the fuel cell.

6. The electric power source apparatus according to claim 5, wherein the upper threshold value of the charging voltage of the auxiliary electric power source is increased in response to the an elevation in temperature of the fuel cell.

7. The electric power source apparatus according to claim 5, wherein the auxiliary electric power source is an electric double layer condenser.

8. The electric power source apparatus according to claim 5, further comprising:

means for memorizing data of the lower threshold value of the discharge voltage or the upper threshold value of the charging voltage of the auxiliary electric power source, wherein the control means changes the charging or discharge voltage of the auxiliary electric power source, based on the data of the lower threshold value or the upper limit threshold value in the memorizing means.

* * * * *